(12) United States Patent
Takashi et al.

(10) Patent No.: US 8,089,717 B1
(45) Date of Patent: Jan. 3, 2012

(54) DATA REPRODUCING APPARATUS FOR IMPROVING DATA RECORDING EFFICIENCY

(75) Inventors: Terumi Takashi, Chigasaki (JP); Kazuhiko Satake, Odawara (JP)

(73) Assignee: Hitachi Global Storage Technologies Japan, Ltd., Kanagawa-Ken (JP)

( * ) Notice: Subject to any disclaimer, the term of this patent is extended or adjusted under 35 U.S.C. 154(b) by 0 days.

(21) Appl. No.: 09/638,607

(22) Filed: Aug. 15, 2000

(30) Foreign Application Priority Data

Sep. 27, 1999 (JP) .................................. 11-271535

(51) Int. Cl.
*G11B 5/09* (2006.01)
(52) U.S. Cl. .......................................... 360/51; 360/46
(58) Field of Classification Search .................. 714/701, 714/769, 770; 360/51, 77.08, 78.14, 46, 360/72.2, 48, 49, 62, 31, 53, 54
See application file for complete search history.

(56) References Cited

U.S. PATENT DOCUMENTS 5,363,252 A * 11/1994 Bentley et al. ................... 360/51
5,379,161 A * 1/1995 Quitana ........................... 360/51

FOREIGN PATENT DOCUMENTS

JP 11-3565 6/1997

* cited by examiner

*Primary Examiner* — Daniell L Negron
*Assistant Examiner* — Regina N Holder
(74) *Attorney, Agent, or Firm* — Sofer & Haroun, LLP

(57) ABSTRACT

When the format control circuit detects bit synchronization information in a sector to be reproduced on a magnetic disk, the format control circuit activates a read gate signal for commanding to read out the sector from the magnetic disk. When symbol synchronization information on the magnetic disk is detected, a SYNC detection circuit produces a synchronization information detection signal. The format control circuit calculates an end position of the sector on the magnetic disk on the basis of the synchronization information detection signal to inactivate the read gate signal. The data correction circuit and the decoding circuit reproduce data and ECC in the sector read out from the magnetic disk during the period that the read gate signal is active on the basis of the synchronization information detection signal to produce the data and ECC to a data bus. The data flow control circuit processes the data and ECC on the data bus after the elapse of a reproduction delay time on the basis of the synchronization information detection circuit.

19 Claims, 21 Drawing Sheets

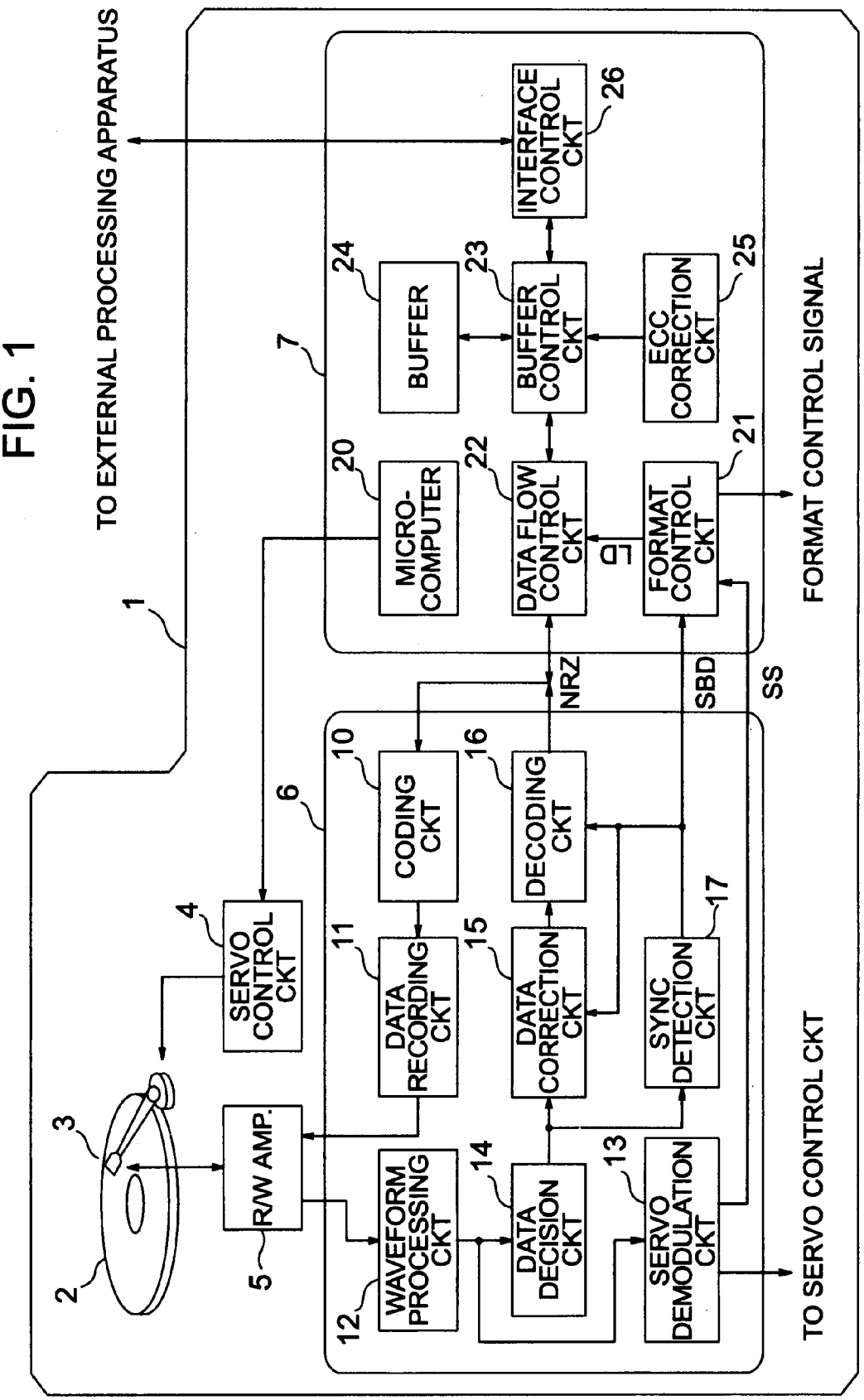

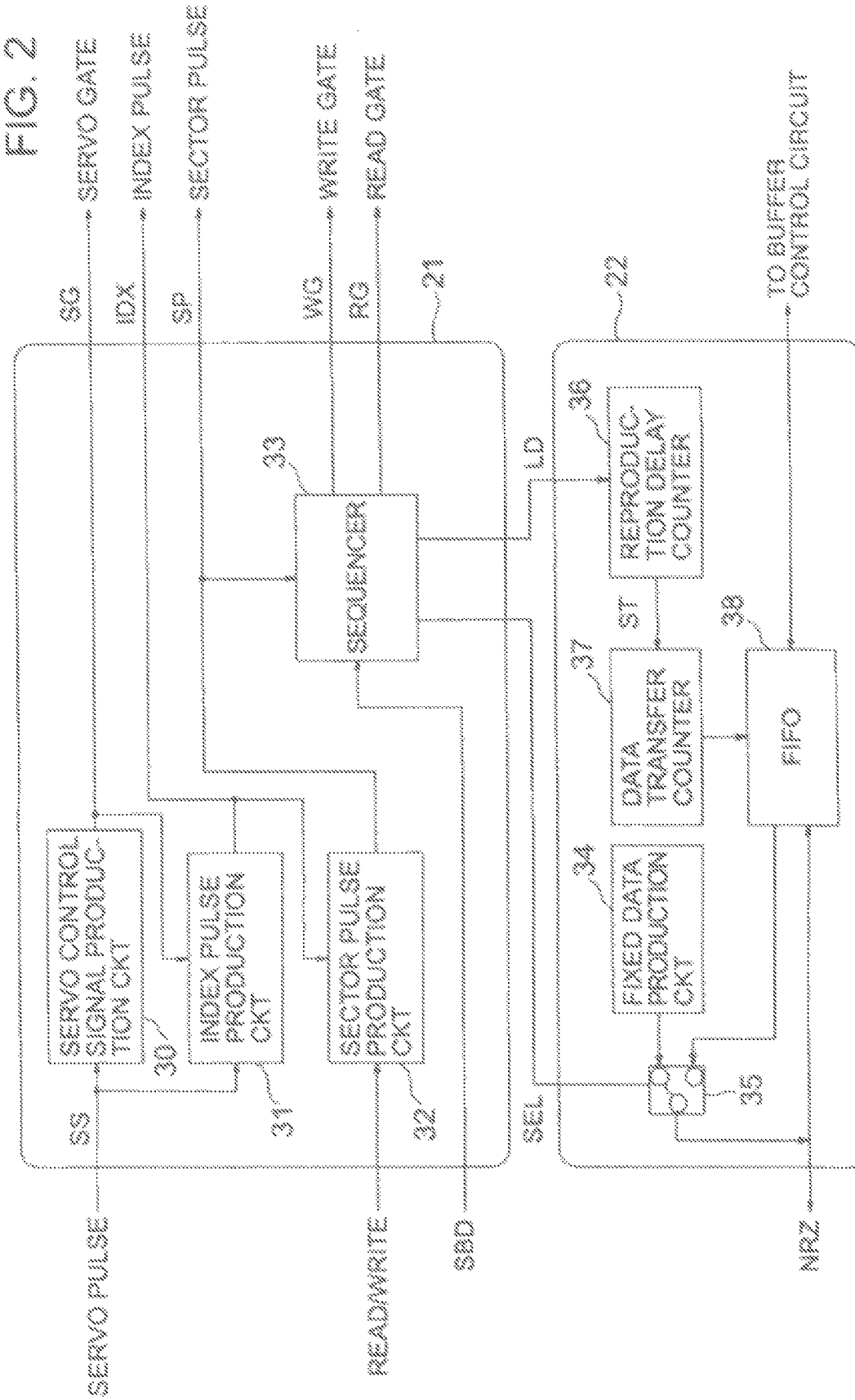

FIG. 7A

USUAL PROCESSING

| | PROCESSING BY SEQUENCER 33 | PROCESSING BY DATA FLOW CONTROL CKT 22 |
|---|---|---|
| step1 | ACTIVATE "RG" SIGNAL | CONTINUE WHEN DATA IS BEING TRANSFERRED |
| step2 | SYNC DETECTED WITHIN FIXED PERIOD? ("SBD" SIGNAL=ACTIVE) | CONTINUE WHEN DATA IS BEING TRANSFERRED |
| step3 | WAIT DURING PRESCRIBED NUMBER OF BYTES | WAIT DURING NUMBER OF REPRODUCTION DELAY BYTES AND THEN START TO TRANSFER DATA OF PRESCRIBED NUMBER OF BYTES |
| step4 | INACTIVATE "RG" SIGNAL | CONTINUE WHEN DATA IS BEING TRANSFERRED |
| step5 | WAIT UNTIL SERVO PERIOD PASSES | CONTINUE WHEN DATA IS BEING TRANSFERRED |
| step6 | ACTIVATE "RG" SIGNAL | CONTINUE WHEN DATA IS BEING TRANSFERRED |
| step7 | SYNC DETECTED WITHIN FIXED PERIOD? ("SBD" SIGNAL=ACTIVE) | CONTINUE WHEN DATA IS BEING TRANSFERRED |
| step8 | WAIT DURING PRESCRIBED NUMBER OF BYTES | WAIT DURING NUMBER OF REPRODUCTION DELAY BYTES AND THEN START TO TRANSFER DATA OF PRESCRIBED NUMBER OF BYTES |
| step9 | INACTIVATE "RG" SIGNAL | CONTINUE WHEN DATA IS BEING TRANSFERRED |

FIG. 7B

EXCEPTIONAL PROCESSING (WHEN SYNC BYTE IS NOT DETECTED WITHIN PRESCRIBED TIME)

| | | |
|---|---|---|
| step1 | INACTIVATE "RG" SIGNAL | CONTINUE WHEN DATA IS BEING TRANSFERRED |
| step2 | NOTIFY OCCURRENCE OF DATA ERROR | CONTINUE WHEN DATA IS BEING TRANSFERRED |

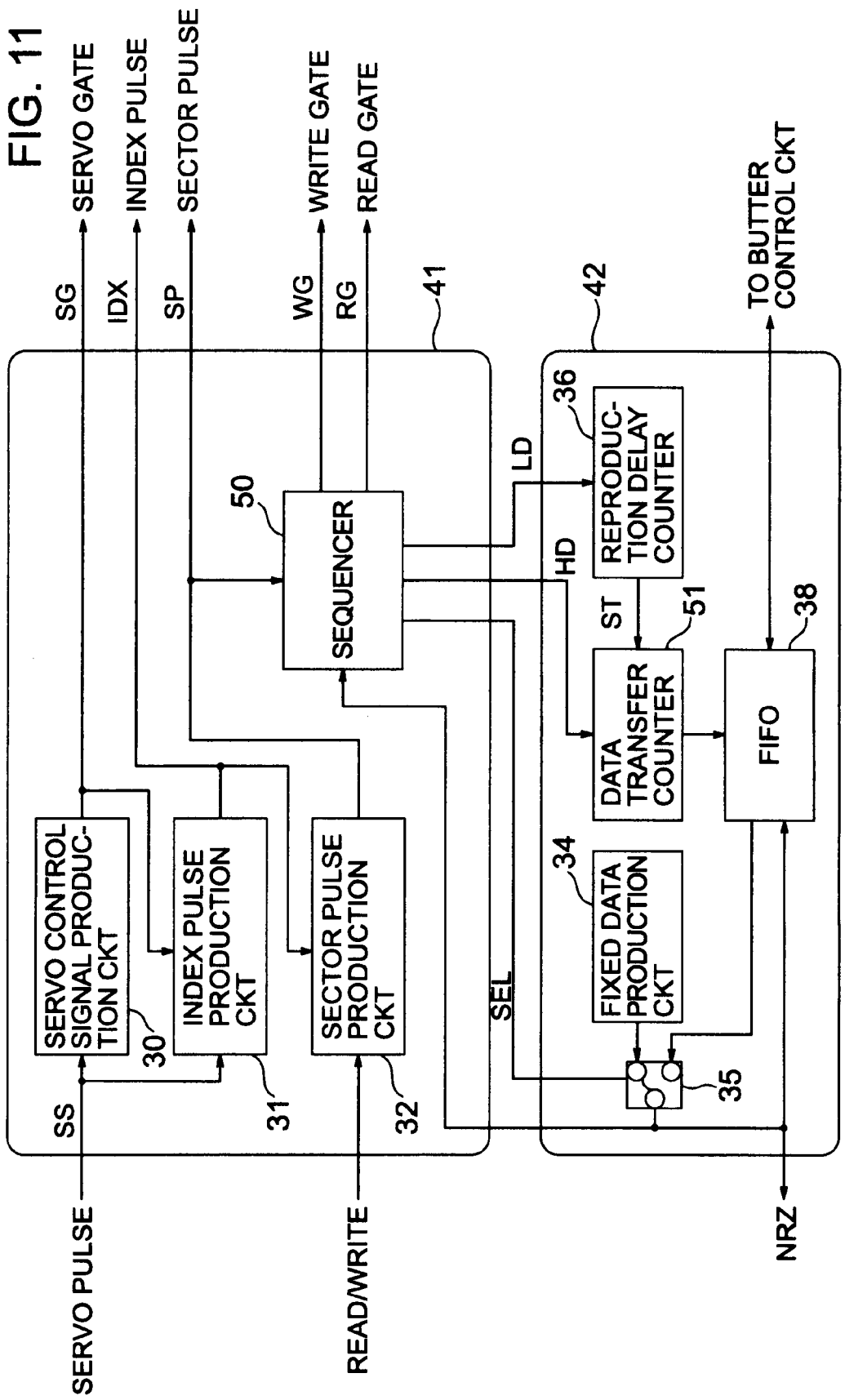

FIG. 12A

USUAL PROCESSING

| step | PROCESSING BY SEQUENCER 50 | PROCESSING BY DATA FLOW CONTROL CKT 42 |
|---|---|---|
| step1 | ACTIVATE "RG" SIGNAL | TEMPORARILY STOP DATA TRANSFER WHEN DATA IS BEING TRANSFERRED |
| step2 | SYNC DETECTED WITHIN FIXED PERIOD? (NRZ DATA=SYNC CODE) | TEMPORARILY STOP DATA TRANSFER |
| step3 | WAIT DURING PRESCRIBED NUMBER OF BYTES | RESUME DATA TRANSFER WHEN DATA TRANSFER IS TEMPORARILY STOPPED / WAIT DURING NUMBER OF REPRODUCTION DELAY BYTES AND THEN START TO TRANSFER DATA OF PRESCRIBED NUMBER OF BYTES |
| step4 | INACTIVATE "RG" SIGNAL | DATA TRANSFER CONTINUES |
| step5 | WAIT UNTIL SERVO PERIOD PASSES | DATA TRANSFER CONTINUES |
| step6 | ACTIVATE "RG" SIGNAL | TEMPORARILY STOP DATA TRANSFER WHEN DATA IS BEING TRANSFERRED |
| step7 | SYNC DETECTED WITHIN FIXED PERIOD? (NRZ DATA=SYNC CODE) | TEMPORARILY STOP DATA TRANSFER |
| step8 | WAIT DURING PRESCRIBED NUMBER OF BYTES | RESUME DATA TRANSFER WHEN DATA TRANSFER IS TEMPORARILY STOPPED / WAIT DURING NUMBER OF REPRODUCTION DELAY BYTES AND THEN START TO TRANSFER DATA OF PRESCRIBED NUMBER OF BYTES |
| step9 | INACTIVATE "RG" SIGNAL | DATA TRANSFER CONTINUES |

FIG. 12B

EXCEPTIONAL PROCESSING (WHEN SYNC CODE IS NOT DETECTED WITHIN PRESCRIBED TIME)

| step | | |
|---|---|---|
| step1 | INACTIVATE "RG" SIGNAL | RESUME DATA TRANSFER WHEN DATA TRANSFER IS TEMPORARILY STOPPED |
| step2 | NOTIFY OCCURRENCE OF DATA ERROR WHEN SYNC IS NOT DETECTED IN STEP 7 | STOP DATA TRANSFER |

FIG. 14A
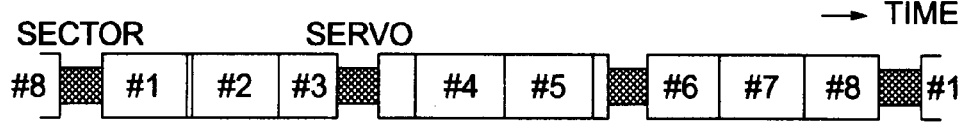
FIG. 14B
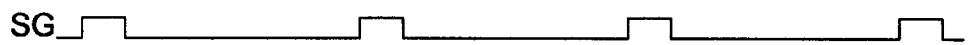
FIG. 14C
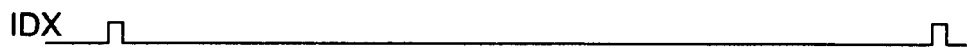
FIG. 14D
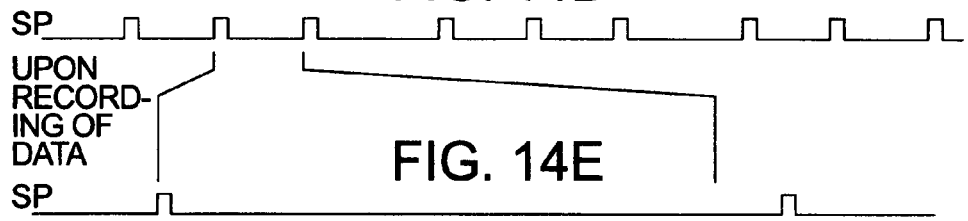
FIG. 14E
FIG. 14F
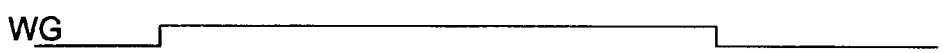
FIG. 14G
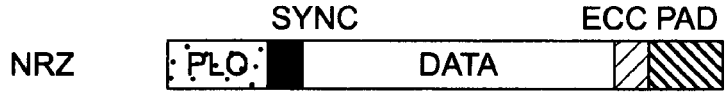
FIG. 14H
FIG. 14I
FIG. 14J
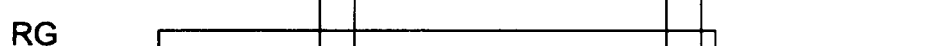
FIG. 14K
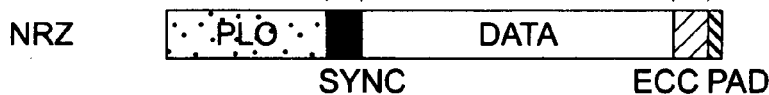

DATA REPRODUCING APPARATUS FOR IMPROVING DATA RECORDING EFFICIENCY

CROSS-REFERENCE TO RELATED APPLICATION

The present invention is related to U.S. patent application Ser. No. 09/445,217 entitled "Method and Device for Recording and Reproducing Data" filed Apr. 13, 1998, which corresponds to Japanese Patent Laid-Open Publication (JP-A) No. 11-3565.

This application claims priority from Japanese Patent Application No. 11-271535 filed Sep. 27, 1999, the entire content of which is incorporated herein by reference for all purposes.

BACKGROUND OF THE INVENTION

The present invention relates to a data recording and reproducing apparatus, and more particularly to a data recording and reproducing apparatus for improving the data recording efficiency of a recording medium.

A general magnetic disk apparatus is now described as an example of a conventional data recording and reproducing apparatus.

The magnetic disk apparatus includes a magnetic disk, a recording circuit for recording data in the magnetic disk, a reproduction circuit for reproducing data from the magnetic disk, and a control circuit for controlling the recording and reproduction operation.

FIG. 13 shows a structure of a magnetic disk.

Concentric tracks t are formed on the magnetic disk 2. Sectors c partitioned by gaps g for absorbing rotational variation or fluctuation of the magnetic disk are formed on the track t. Further, servo areas s are formed intermittently in the circumferential direction of the magnetic disk. When one sector c is divided by the servo area s, the sector c is named a split sector. The sector c which is not divided by the servo area s is named a non-split sector.

FIG. 14 is a diagram for explaining an arrangement of information on the track and an index pulse signal IDX, a servo gate signal SG and a sector pulse signal SP for controlling the recording timing and the reproduction timing.

The index pulse signal IDX is a signal indicative of a start point of the track and is generated once per rotation of the magnetic disk 2.

The servo gate signal SG is a signal indicative of the servo area and is generated at regular intervals from the index pulse signal IDX.

The sector pulse signal SP is a signal indicative of a start point of the sector and is generated on the basis of the index pulse signal IDX.

Upon Recording of Data

Recording of data is made as follows:

The control circuit activates a write gate signal WG for a sector in which data is to be recorded in response to the sector pulse signal SP. At the same time, the control circuit produces to a data bus NRZ a series of sector information, that is, a bit synchronization information PLO, a symbol synchronization information SYNC, data DATA, an error check code ECC used to perform error detection and correction, and pad information PAD for absorbing reproduction delay. When the series of sector information is produced, the control circuit activates a write gate signal WG.

The recording circuit records the series of sector information produced to the data bus NRZ on the track t of the magnetic disk 2 after the elapse of a delay named a record delay. The time corresponding to the record delay is previously contained in the series of sector information and a length of data actually recorded on the track t is shorter than a length of the series of sector information.

Upon Reproduction of Data

Reproduction of data is made as follows:

The control circuit activates a read gate signal RG for a sector from which data is to be reproduced in response to the sector pulse signal SP.

When the read gate signal RG is activated, the reproduction circuit produces the bit synchronization information PLO to reproduce the symbol synchronization information SYNC, the data DATA, the error check code ECC and the pad information PAD succeeding to the bit synchronization information PLO on the magnetic disk and produces them to the data bus NRZ.

In this connection, the symbol synchronization information SYNC, the data DATA, the error check code ECC and the pad information PAD produced to the data bus NRZ are delayed by a time required for reproduction processing as compared with the symbol synchronization information SYNC, the data DATA, the error check code ECC and the pad information PAD on the magnetic disk. This delay time is named a reproduction delay time.

The control circuit detects the beginning of the data DATA in response to detection of the symbol synchronization information SYNC on the data bus NRZ and processes the data DATA and the error check code ECC. Further, the control circuit inactivates the read gate signal RG after the time corresponding to the number of bytes of data to be transferred, starting from the detection of the symbol synchronization information SYNC.

When the read gate signal RG is inactivated, the reproduction circuit stops outputting of the data reproduced from the magnetic disk.

SUMMARY OF THE INVENTION

In the conventional magnetic disk apparatus, in order to ensure that the reproduction circuit reads out information in a sector from the magnetic disk until the control circuit inactivates the read gate signal RG after the control circuit has activated the read gate signal RG at the beginning of the sector, it is necessary to provide a pad area PAD longer than the reproduction delay time on the magnetic disk.

The reproduction circuit generally adopts the PRML (Partial Response Maximum Likelihood) signal processing system which can reproduce a low-S/N signal, while since the PRML signal processing system has a tendency that the reproduction delay time is increased, there is a tendency that the pad area PAD is also increased.

However, when the pad area PAD increases, there is a problem that the data storage area which can be used effectively is reduced and the data recording efficiency is reduced.

Further, even in the recording operation, it is necessary to provide the pad area PAD for the recording delay time for a recording beginning position of a sector until the write gate signal WG is inactivated after it has been activated.

Accordingly, an object of the invention is to provide a data reproduction apparatus which can suppress the increase of the pad are PAD and improve data recording efficiency of a recording medium.

To this end, a data reproduction apparatus is provided having a synchronization information detection circuit for detecting synchronization information of a block to be reproduced from a recording medium in which a series of data strings having the synchronization information added thereto is recorded as a block to produce a synchronization information detection signal. A block end position calculation circuit calculates an end position of the block on the recording medium on a basis of the synchronization information detection signal.

A data reproduction circuit reads out data recorded from the detected synchronization information to the calculated end position of the block from the recording medium to reproduce the data. A data processing circuit processes data produced from the data reproduction circuit after elapse of a reproduction delay time on the basis of the synchronization information detection signal.

A first unit includes the synchronization information detection circuit and the data reproduction circuit and a second unit includes the block end position calculation circuit and the data processing circuit, where the synchronization information detection signal is sent from the first unit to the second unit and the data is sent from the first unit to the second unit, after the synchronization information detection signal has been sent.

The synchronization information detection signal and the data are sent from the first unit to the second unit through the same signal line. When synchronization information, of a second block continuing to a first block is detected while the data reproduction circuit produces a data string of the first block, outputting of the data string of the first block is temporarily reserved. After the synchronization information detection circuit detects the synchronization information of the second block or after a predetermined time elapses from the time that the synchronization information is not detected, the outputting of the data string of the first block is resumed.

BRIEF DESCRIPTION OF THE DRAWINGS

FIG. 1 is a block diagram schematically illustrating a magnetic disk apparatus according to a first embodiment;

FIG. 2 is a block diagram schematically illustrating a format control circuit and a data flow control circuit in the first embodiment;

FIGS. 7A and 7B are diagram for explaining control procedures of a sequencer and the data flow control circuit in the first embodiment;

FIG. 11 is a block diagram schematically illustrating a format control circuit and a data flow control circuit in the second embodiment;

FIGS. 12A and 12B are diagrams for explaining control procedures of a sequencer and the data flow control circuit in the second embodiment;

FIGS. 14A to 14K are timing diagrams showing the relation of information on a track and format control signals in a conventional magnetic disk apparatus;

DESCRIPTION OF THE EMBODIMENTS

Figure 3A:
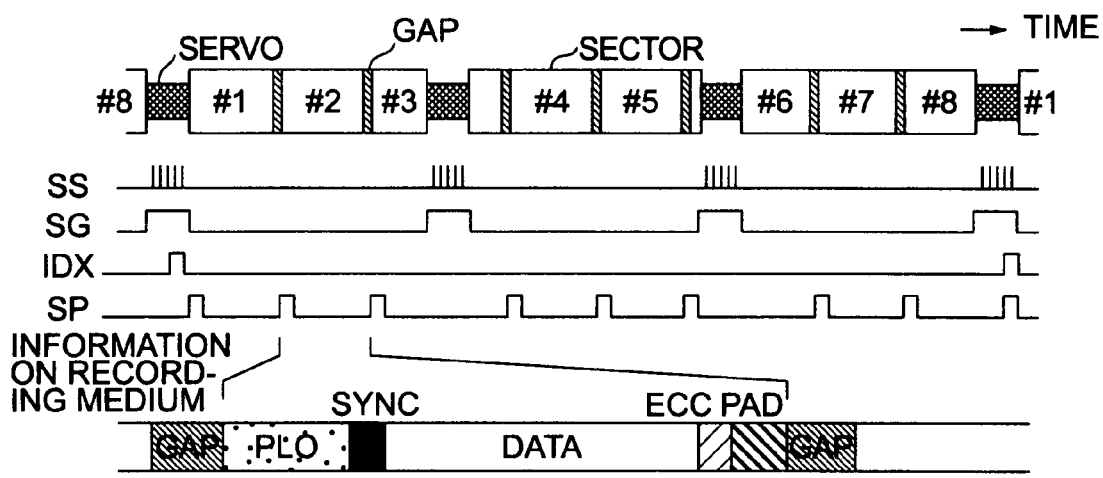
FIGS. 3A to 3C are timing diagrams showing the relation of information on a track and format control signals in the first embodiment.

Embodiments of the present invention are now described with reference to the accompanying drawings. The present invention is not limited to the embodiments.

First Embodiment

FIG. 1 schematically illustrates a magnetic disk apparatus according to a first embodiment of the present invention.

The magnetic disk apparatus 1 includes a magnetic disk 2, a recording and reproducing head 3 for converting magnetic information recorded on the magnetic disk 2 into an electric signal, a servo control circuit 4 for controlling to position the recording and reproducing head 3, an R/W (read/write) amplifier 5 for interfacing a record and reproduction signal, a record and reproduction processing circuit 6 for processing digital data, and a data control circuit 7 for controlling recording and reproducing of data.

The record and reproduction processing circuit 6 includes a coding circuit 10 and a data recording circuit 11 constituting a data recording path, a waveform processing circuit 12, a data decision circuit 14, a data correction circuit 15 and the decoding circuit 16 constituting a data reproduction path, a servo demodulation circuit 13 constituting a servo control path, and a SYNC detection circuit 17 constituting synchronization information detecting means for supplying a synchronization information detection signal SBD to the data control circuit 7.

The R/W amplifier 5, the waveform processing circuit 12, the data decision circuit 14, the data correction circuit 15 and the decoding circuit 16 are sometimes named a data reproduction circuit collectively.

The data control circuit 7 includes a microcomputer 20, a format control circuit 21 for producing various control signals on the basis of a servo pulse signal SS and a synchronization information detection signal SBD, a data flow control circuit 22 constituting data processing means for controlling data on the data bus NRZ under control of the format control circuit 21, a buffer control circuit 23, a buffer 24, an ECC correction circuit 25, and an interface control circuit 26 constituting a connection portion with an external processing apparatus.

The data flow control circuit 22, the buffer control circuit 23 and the ECC correction circuit 25 are sometimes named a data processing circuit collectively.

The internal circuits included in the record and reproduction processing circuit 6 and the data control circuit 7 are connected through signal lines such as buses or paths and signals are transmitted among the internal circuits in the arrow direction shown in FIG. 1. Further, the record and reproduction processing circuit 6 and the data control circuit 7 are also connected through signal lines.

Operation Except Recording and Reproduction Operation

The servo control circuit 4 performs control using servo information of the servo area in the operation except the recording and reproducing operation, that is, in the unrecording and unreproducing operation and the recording and reproducing head 3 is positioned on any track.

The timing of the servo information is indicated by the servo gate signal SG of the format control signals produced by the format control circuit 21.

When the servo gate signal SG is activated, the servo demodulation circuit 13 uses the servo information obtained through the recording and reproducing head 3, the R/W amplifier 5 and the waveform processing circuit 12 to produce the serve pulse signal SS indicating the servo area, which signal is supplied to the format control circuit 21. Further, the servo demodulation circuit 13 supplies a track position shift or deviation amount of the recording and reproducing head 3 to the servo control circuit 4.

The servo control circuit 4 feeds back the position shift amount so that the recording and reproducing head 3 tracks or follows the track.

Recording Operation

The recording operation is started when the external processing apparatus sends out a write command.

Subsequently to the write command, the external processing apparatus supplies data to be recorded to the interface control circuit 26.

The interface control circuit 26 receives the write command from the external processing apparatus and supplies the write command and a logical address contained therein to the microcomputer 20.

The microcomputer 20 converts the logical address into a physical address and supplies a seeking instruction for the recording and reproducing head 3 to the servo control circuit 4.

The servo control circuit 4 moves the recording and reproducing head 3 to a track corresponding to the physical address. In parallel to this movement, the data to be recorded is temporarily stored in the buffer 24 through the interface control circuit 26 and the buffer control circuit 23.

The format control circuit 21 prepares the servo gate signal SG, the index pulse signal IDX and the sector pulse signal SP on the basis of the servo pulse signal SS.

The format control circuit 21 activates the write gate signal WG when the sector number corresponding to the sector pulse signal SP is coincident with a record sector number given by the physical address. The format control circuit 21 controls the data flow control circuit 22 to output a series of sector information, that is, the bit synchronization information PLO, the symbol synchronization information SYNC, the data DATA temporarily stored in the buffer 24, the error check code ECC constituting the correction information for performing data correction prepared by the ECC correction circuit 25, and the pad information PAD constituting the additional area, to the data bus NRZ successively.

Further, POST information composed of several bytes for ensuring data processing of the error check code ECC is provided between the error check code ECC and the pad information PAD, while the POST information is not directly related to the present invention and accordingly description thereof is omitted.

The outputted sector information is coded to a specific code by the coding circuit 10 and is supplied to the data recording circuit 11.

The data recording circuit 11 adds a data correction code to the coded parallel data row to be outputted to the R/W amplifier 5 as a serial data string.

The R/W amplifier 5 records the serial data string on the pertinent track as sector information by means of the recording and reproducing head 3.

Reproduction Operation

The reproduction operation is started when the external processing apparatus sends out a read command. The timing of the control signal is described later.

The interface control circuit 26 receives the read command and supplies a logical address contained in the read command to the microcomputer 20.

The microcomputer 20 converts the logical address into a physical address and supplies a seeking instruction to the servo control circuit 4 so that the recording and reproducing head 3 is moved on a track from which data is to be reproduced.

The format control circuit 21 prepares the sector pulse signal SP on the basis of the servo pulse signal SS processed by the recording and reproducing head 3, the R/W amplifier 5, the waveform processing circuit 12 and the servo demodulation circuit 13. The sector pulse signal SP leads the sector pulse signal SP in the recording operation.

When the sector number corresponding to the sector pulse signal SP is coincident with the sector number for reproduction given by the physical address, the format control circuit 21 activates the read gate signal RG.

The sector information is reproduced as serial digital data by means of the R/W amplifier 5, the waveform processing circuit 12 and the data decision circuit 14.

The SYNC detection circuit 17 detects the symbol synchronization information SYNC from the sector information and activates the synchronization information detection signal SBD The data correction circuit 15 performs correction of data by means of the data correction code (CRC, ECC or the like) after the synchronization information detection signal SBD has been activated.

The decoding circuit 16 outputs the serial data string to the data bus NRZ as parallel data.

The format control circuit 21 counts the number of bytes of data to be transferred on the basis of the synchronization information detection signal SBD and inactivates the read gate signal RG when the sector end position is reached. That is, the format control circuit 21 calculates the sector end position on the basis of the synchronization information detection signal SBD and notifies the calculated end position to the record and reproduction processing circuit 6 side. By changing the timing for inactivating the read gate signal RG on the basis of the calculated end position, the timing for inactivating the read gate signal RG does not contain the reproduction delay time. Accordingly, the pad area PAD is minimized irrespective of the reproduction delay time.

The arrival of data to the data flow control circuit 22 is delayed by the processing time in the data correction circuit 15 and the decoding circuit 16, that is, the reproduction delay time as compared with the synchronization information detection signal SBD. The data flow control circuit 22 counts the number of bytes corresponding to the reproduction delay time after the synchronization information detection signal SBD is activated and then stores data in the buffer 24 by means of the buffer control circuit 23.

The ECC correction circuit 25 performs the error verification of the data stored in the buffer 24 on the basis of the error check code ECC and when any error is detected, the ECC correction circuit 25 corrects the error.

The data stored in the buffer 24 is sent out to the external processing apparatus through the buffer control circuit 23 and the interface control circuit 26 under control of the microcomputer 20 when the data correction is completed or when there is no error in the data.

FIG. 2 schematically illustrates the internal configuration of the format control circuit 21 and the data flow control circuit 22.

The format control circuit 21 includes a servo control signal production circuit 30, an index pulse production circuit 31, a sector pulse production circuit 32 and a sequencer 33.

The servo control signal production circuit 30 produces the servo gate signal SG on the basis of the servo pulse signal SS.

The index pulse production circuit 31 discriminates the servo pulse signal SS in the period that the servo gate signal SG is active and produces the index pulse signal IDX.

The sector pulse production circuit 32 produces the sector pulse signal SP having phases different depending on the reproduction operation and the recording operation on the basis of the index pulse signal IDX.

The sequencer 33 is to control the sector format and produces the write gate signal WG indicative of the sector recording period, the read gate signal RG indicative of the sector reproduction period and a selection signal SEL and a load signal LD for controlling the data flow control circuit 22.

The data flow control circuit 22 includes a fixed data production circuit 34, an FIFO 38, a selection circuit 35, a reproduction delay counter 36 and the data transfer counter 37.

The fixed data production circuit 34 produces a code string of the bit synchronization information PLO, the symbol synchronization information SYNC and the pad information PAD and is connected to a first terminal of the selection circuit 35.

The FIFO 38 produces a code string of the data DATA and the error check code ECC supplied from the buffer control circuit 23 and is connected to a second terminal of the selection circuit 35.

The selection circuit 35 selects the fixed data production circuit 34 when the selection signal SEL from the sequencer 33 is "1" and selects the FIFO 38 when the selection signal SEL is "0" to produce the signal from the selected circuit to the data bus NRZ.

Figure 3B:
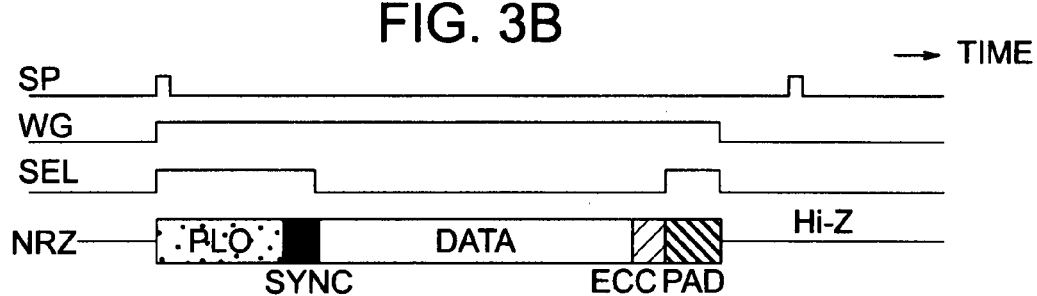
Figure 3C:
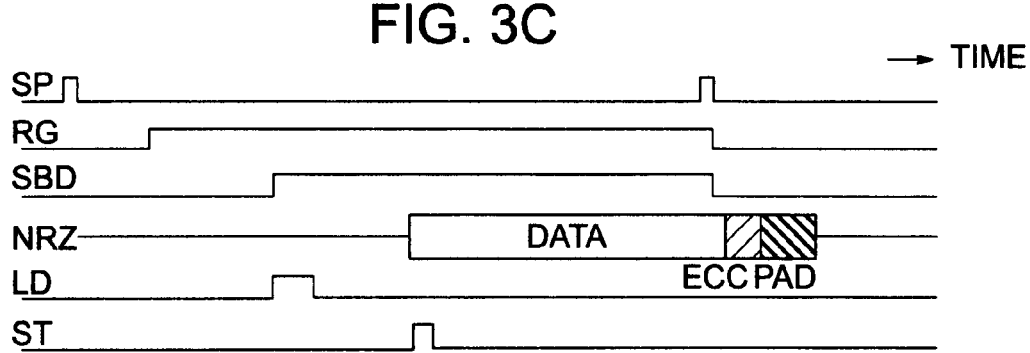

FIGS. 3A to 3C show the timing of the servo gate signal SG, the index pulse signal IDX and the sector pulse signal SP and the data arrangement on the magnetic disk 2. FIGS. 3A to 3C show an example that 3 servo areas and 8 sectors are provided during one rotation of the magnetic disk 2.

The servo gate signal SG is active in each of the servo areas. The index pulse signal IDX becomes active once each time the magnetic disk 2 makes one rotation and accordingly in the embodiment the index pulse signal IDX becomes active once during the three-servo period.

The sector pulse signal SP is active at the beginning position of each sector. Small gap areas are formed between the sectors. One sector includes the bit synchronization information PLO, the symbol synchronization information SYNC, the data DATA, the error check code ECC and the pad area PAD.

Recording Operation

In the recording operation, as shown in FIG. 3B, the sector pulse signal SP is active at the sector beginning position. Further, the write gate signal WG is active in synchronism with the sector pulse signal SP in order to record data in the sector.

A series of sector information including the bit synchronization information PLO, the symbol synchronization information SYNC, the data DATA, the error check code ECC and the pad information PAD to be recorded is prepared by the fixed data production circuit 34, the FIFO 38 and the selection circuit 35 on the basis of the selection signal SEL produced by the sequencer 33. That is, the sequencer 33 first sets the selection signal SEL to "1" to thereby select the output of the fixed data production circuit 34 so that the bit synchronization information PLO and the symbol synchronization information SYNC are outputted to the data bus NRZ. Then, the sequencer 33 sets the selection signal SEL to "0" to thereby select the output of the FIFO 38 so that the data DATA and the error check code ECC are outputted to the data bus NRZ. The sequencer 33 then sets the selection signal SEL to "1" to thereby select the output of the fixed data production circuit 34 so that the pad information PAD is outputted to the data bus NRZ. Finally, the sequencer 33 inactivates the write gate signal WG and ends the recording operation.

Reproduction Operation

In the reproduction operation, as shown in FIG. 3C, the sector pulse signal SP leads the data recording operation. This reason is that the read gate signal RG is certainly controlled to be active at the leading position of the sector against variation of the sector beginning position due to the rotational variation. That is, when the read/write signal is in the state indicating the reproduction operation, the sector pulse production circuit 32 advances the phase of the sector pulse signal SP as compared with the case where the read/write signal is in the state indicating the recording operation.

The sequencer 33 activates the read gate signal RG at the sector beginning position with reference to the sector pulse signal SP. Then, the sequencer 33 inactivates the read gate signal RG after the elapse of a prescribed number of bytes counted from detection of the symbol synchronization information SYNC.

When the sequencer 33 detects the synchronization information detection signal SBD supplied from the SYNC detection circuit 17, the sequencer starts counting operation of the reproduction delay counter 36 by means of the load signal LD. When the reproduction delay counter 36 counts the number of bytes corresponding to the reproduction delay time of the data correction circuit 15 and the decoding circuit 16, the reproduction delay counter produces an ST signal. The data transfer counter 37 is triggered by the ST signal and then counts data of a prescribed number of bytes. During the counting of the data, the data DATA and the error check code ECC on the data bus NRZ are supplied to the buffer control circuit 23 through the FIFO 38.

The prescribed number of bytes is the number of bytes corresponding to the data DATA and the error check code ECC basically, while it is different depending on the case of the non-split sector that is not divided by the servo area and the case of the split sector that is divided by the servo area.

Figure 4A:
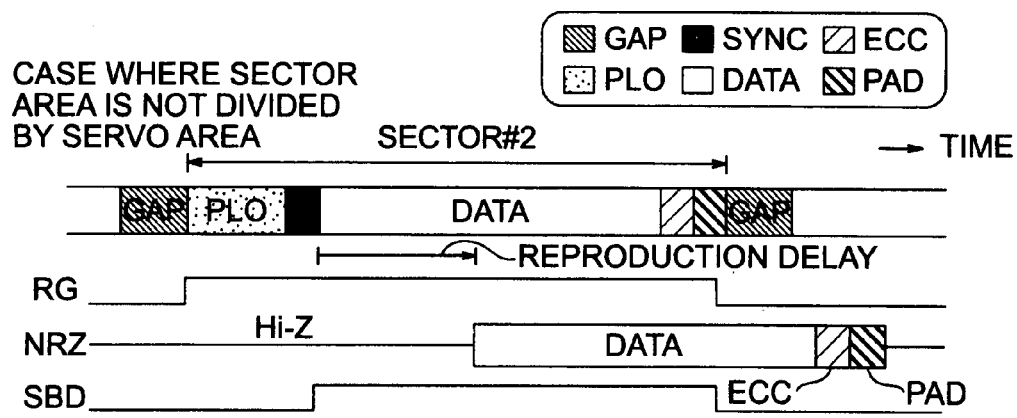
FIGS. 4A and 4B are timing diagrams showing single sector reproduction operation in the first embodiment.
Figure 4B:
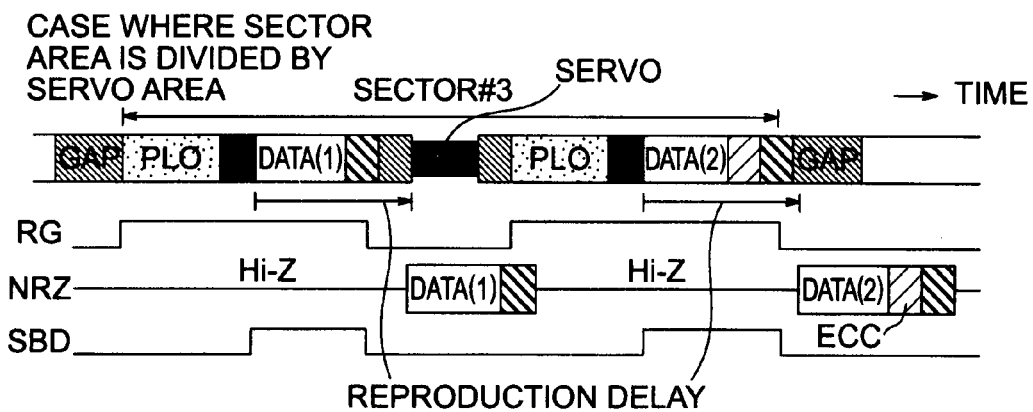

FIGS. 4A and 4B show the output timing of the control signals in the reproduction operation of a single data sector.

FIG. 4A shows the output timing of the control signals for the non-split sector (sector #2).

The read gate signal RG is active from the sector beginning position on the magnetic disk to the middle position of the pad area PAD.

The synchronization information detection signal SBD is active when the symbol synchronization information SYNC is detected by the SYNC detection circuit 17 and is inactive when the read gate signal RG becomes inactive.

The data bus NRZ of the decoding circuit 16 is in the high impedance state (Hi-Z) at the beginning of the reproduction operation and the data DATA, the error check code ECC and data in the pad area PAD are outputted after the elapse of the reproduction delay time starting from outputting of the synchronization detection signal SBD.

The synchronization information detection signal SBD and the data on the data bus NRZ having the above-mentioned timing relation are controlled by the format control circuit 21 and the data flow control circuit 22 as described above.

FIG. 4B shows the output timing of the control signals for the split sector (sector #3).

The read gate signal RG for the first half sector (named sector #3(*a*)) positioned before the servo area is active from the beginning position of the bit synchronization information PLO of the sector #3(*a*) to the middle portion of the pad area PAD. The read gate signal RG for the second half sector (named sector #3(*b*)) positioned behind the servo area is active from the beginning position of the bit synchronization information PLO of the sector #3(*b*) to the middle portion of the pad area PAD.

The synchronization information detection signal SBD becomes active when the symbol synchronization information SYNC of the sector #3(*a*) is detected by the SYNC detection circuit 17 and becomes inactive when the read gate signal RG becomes inactive. Further, the synchronization information detection signal SBD becomes active when the symbol synchronization information SYNC of the sector #3(*b*) is detected by the SYNC detection circuit 17 and becomes inactive when the read gate signal RG becomes inactive.

The data DATA(1) and the pad information PAD are produced through the data bus NRZ after the elapse of the reproduction delay time from the synchronization information detection signal SBD detected in the sector #3(*a*) and thereafter the data bus NRZ becomes the high-impedance state. Further, the data DATA(2), the error check code ECC and the pad information PAD are produced through the data bus NRZ after the elapse of the reproduction delay time from the synchronization information detection signal SBD detected in the sector #3(*b*) and thereafter the data bus NRZ becomes the high-impedance state. The reproduction delay time for the sector #3(*a*) is equal to that for the sector #3(*b*) and further the servo period is not zero. Accordingly, the sector #3(*a*) does not collide with the sector #3(*b*) on the data bus NRZ.

The synchronization information detection signal SBD and the data on the data bus NRZ having the above-mentioned timing relation are controlled by the format control circuit 21 and the data flow control circuit 22 as described above.

Figure 5A:
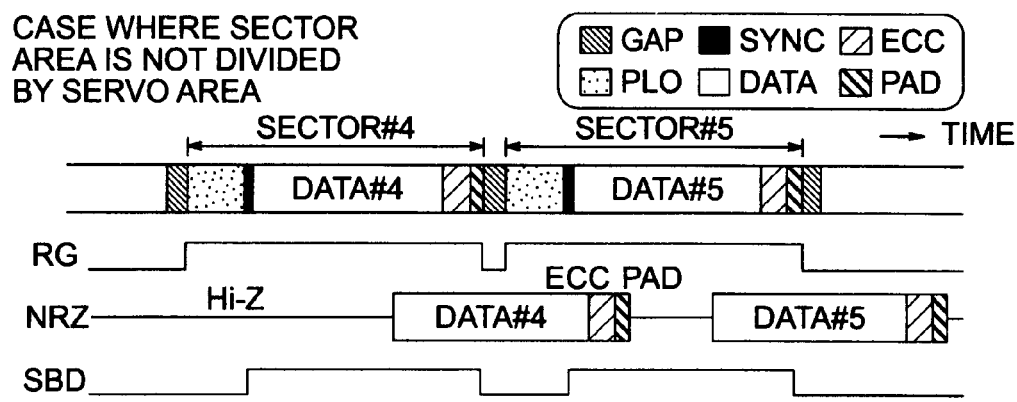
FIGS. 5A and 5B are timing diagrams showing successive sector reproduction operation in the first embodiment.
Figure 5B:
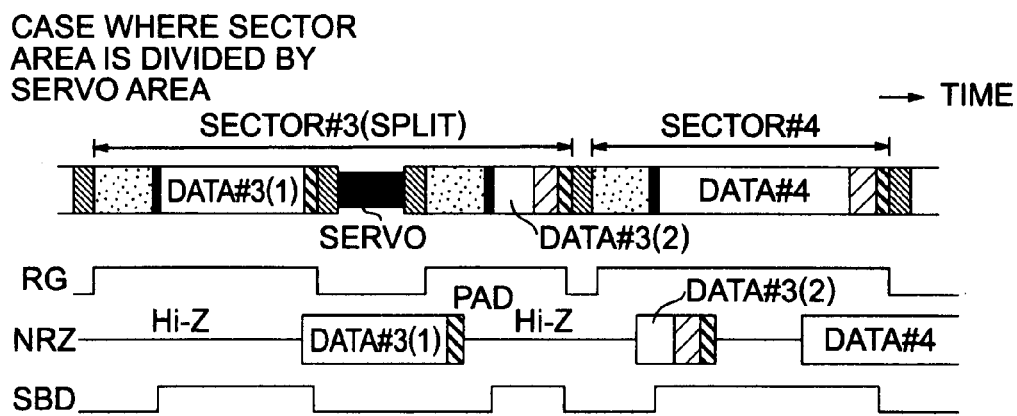

FIGS. 5A and 5B show the output timing of the control signals in the reproduction operation for successive data sectors.

FIG. 5A shows the output timing of the control signals for successive reproduction of non-split sectors (sectors #4 and #5).

The read gate signal RG, the synchronization information detection signal SBD and the data bus NRZ are produced at the same timing as in the reproduction operation for the single sector.

The synchronization information detection signal SBD becomes inactive at the same time that the read gate signal RG for the sector #4 becomes inactive. Accordingly, the format control circuit 21 can detect the beginning position of the symbol synchronization information SYNC in the next sector #5 in accordance with the synchronization information detection signal SBD.

The sectors #4 and #5 do not overlap each other on the data bus NRZ since the gap area GAP, the bit synchronization information PLO for the sector #5 and symbol synchronization information SYNC are not reduced to zero.

Accordingly, the data for each sector can be stored in the pertinent buffer 24 by the format control circuit 21 and the data flow control circuit 22.

FIG. 5B shows the output timing of the control signals for successive reproduction of the split sector (sector #3) and the non-split sector (sector #4).

The read gate signal RG, the synchronization information detection signal SBD and the data bus NRZ are produced at the combined timing of the timing in the reproduction operation of the single split sector and the timing in the reproduction operation of the single non-split sector The synchronization information detection signal SBD is the same as FIG. 5A. Accordingly, the format control circuit 21 can detect the beginning position of the pertinent symbol synchronization information SYNC in accordance with the synchronization information detection signal SBD.

Further, similarly, the sectors do not overlap each other on the data bus NRZ. Accordingly, the data for each sector can be stored in the pertinent buffer 24.

Figure 6A:
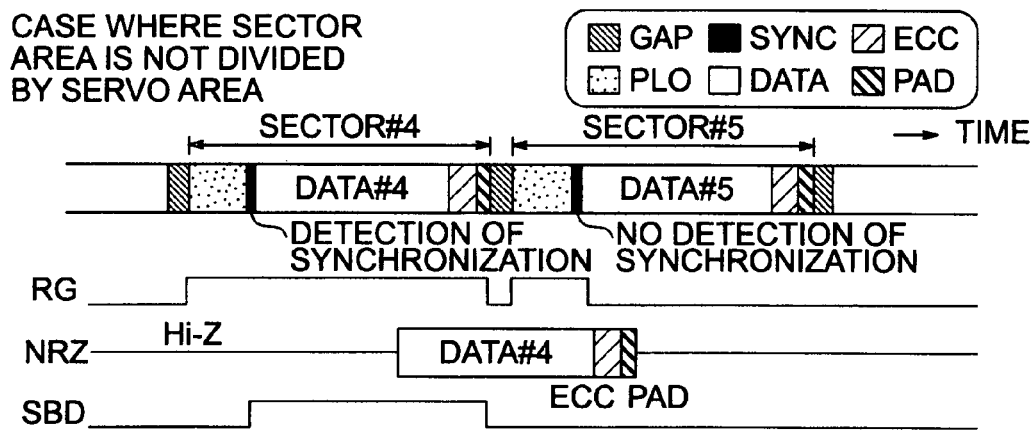
FIGS. 6A and 6B are timing diagrams showing reproduction operation in case where symbol synchronization information SYNC is not detected in the first embodiment.
Figure 6B:
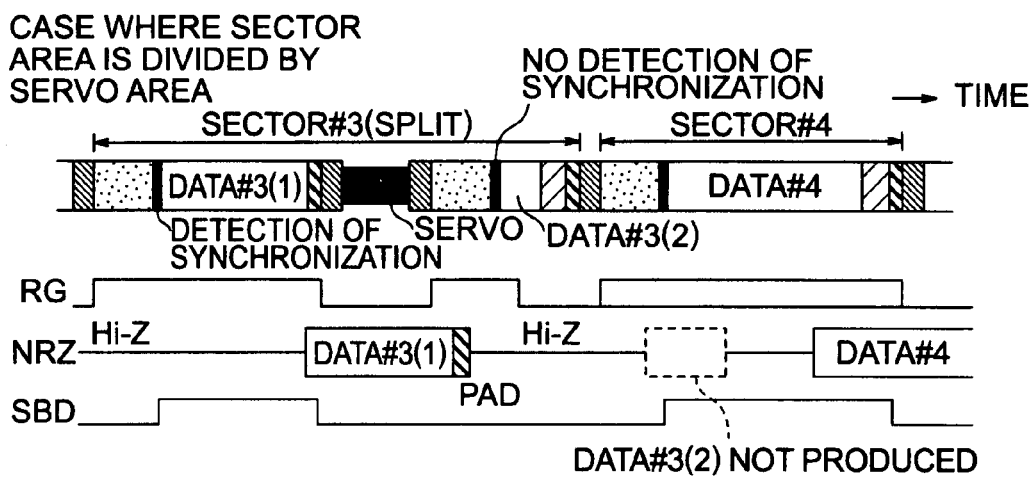

Referring now to FIGS. 6A and 6B, operation in case where the symbol synchronization information SYNC cannot be detected exactly due to decision error of the data decision circuit 14 is described.

FIG. 6A shows the timing in case where the symbol synchronization information SYNC for the sector #5 cannot be detected exactly in the successive reproduction operation of the non-split sectors (sectors #4 and #5).

The reproduction operation for the sector #4 is the same as FIG. 5A.

The read gate signal RG for the sector #5 is active at the beginning position of the bit synchronization information PLO, while since the synchronization information detection signal SBD is not active during a predetermined period, the sequencer 33 inactivates the read gate signal RG. The predetermined period is assumed to be a period slightly longer than the period from the sector beginning position to the symbol synchronization information SYNC. Since the synchronization information detection signal SBD is not active, the data correction circuit 15 and the decoding circuit 16 do not produce the data DATA (DATA #5) for the sector #5 to the data bus NRZ. Accordingly, the data DATA (DATA #4) for the sector #4 is normally stored in the buffer 24, while the data DATA (DATA #5) for the sector #5 is not stored in the buffer 24. Therefore, the reproduction operation for the sector #5 is made again by retrying processing.

FIG. 6B shows the timing in case where the symbol synchronization information SYNC for the sector (sector #3(2)) positioned behind the servo area for the split sector #3 cannot be detected exactly in the successive reproduction operation for the split sector (sector #3) and the non-split sector (sector #4).

The reproduction operation for the sector (sector #3(1)) positioned before the servo area for the split sector #3 is the same as FIG. 5B.

The read gate signal RG for the sector (sector #3(2)) positioned behind the servo area for the split sector #3 is active at the beginning position of the bit synchronization information PLO, while since the synchronization information detection signal SBD is not active during a predetermined period, the sequencer 33 inactivates the read gate signal RG. Since the synchronization information detection signal SBD is not active, the data correction circuit 15 and the decoding circuit 16 do not output the data DATA (DATA #3(2)) of the sector #3(2) to the data bus NRZ.

The reproduction operation for the non-split sector #4 is the same as FIG. 5B. Accordingly, the reproduction operation for the data of the split sector #3 is made again by retrying processing.

FIGS. 7A and 7B show control procedures of the sequencer 33 and the data flow control circuit 22.

The control procedures include usual processing (1) for processing the non-split sector and the split sector and exceptional processing (2) performed when the symbol synchronization information SYNC is not detected within a prescribed time.

The usual processing shown in FIG. 7A is made in steps 1 to 9.

The sequencer 33 activates the read gate signal RG in step 1. In step 2, it is confirmed whether the synchronization information detection signal SBD is detected within a fixed period or not and when it is detected, the control proceeds to step 3. When the synchronization information detection signal SBD is not turned to active within the fixed period, the control proceeds to the exceptional processing. In step 3, the control comes in the waiting state until the prescribed number of bytes is counted in order to ensure to maintain the read gate signal RG to be active during the data DATA, the error check code ECC and the pad area PAD. The prescribed number of bytes is the number of bytes equal to a sum of the data DATA, the error check code ECC and the pad area PAD for the non-split sector and the prescribed number of bytes is the number of bytes equal to a sum of the data DATA and the pad area PAD existing until the servo area (in the example of FIG. 4B, the total byte number of DATA (1) and its subsequent pad area PAD) for the split sector. In step 4, the read gate signal RG is inactivated.

In the case of the non-split sector, since the data of the prescribed number of bytes is processed, the operation for the non-split sector is ended in step 4.

In the case of the split sector, the control comes in the waiting state until the servo period passes in step 5 and then the split sector positioned behind the servo area is processed. The read gate signal RG is activated again in step 6 and the synchronization information detection signal SBD is detected in step 7. When the synchronization information detection signal SBD is not detected within the fixed period, the control proceeds to the exceptional processing. After the control is in the waiting state during the prescribed number of bytes (in the example of FIG. 4B, the total byte number of the DATA (2), the ECC and the pad area PAD) in step 8, the read gate signal RG is inactivated in step 9.

The data flow control circuit 22 continues data transfer basically when data is being transferred except steps 3 and 8. In steps 3 and 8, the control is in the waiting state during the number of reproduction delay bytes in response to the load signal LD supplied from the sequencer 33 and data of the prescribed number of bytes is transferred.

The exceptional processing shown in FIG. 7B is made in steps 1 and 2.

The sequencer 33 inactivates the read gate signal RG in step 1 and notifies occurrence of data error to the microcomputer 20 in step 2 to make retrying processing.

The data flow controller 22 continues data transfer when data is being transferred.

According to the magnetic disk apparatus 1 of the first embodiment, the synchronization information detection signal is not produced from the data correction circuit 15 and the decoding circuit 16 which produce the outputs delayed by the reproduction delay time but the synchronization information detection signal SBD is produced from the SYNC detection circuit 17 capable of producing the output without substantial delay. Accordingly, the format control circuit 21 can inactivate the read gate signal RG exactly at the end position of the sector on the magnetic disk on the basis of the synchronization information detection signal SBD without influence of the reproduction delay time. Accordingly, it is necessary to provide the pad area PAD longer than the reproduction delay time in the end portion of the sector in order to ensure that the record and reproduction processing circuit 6 reads out information of a sector from the magnetic disk. Thus, the pad area PAD is minimized and the effectively usable data storage area can be increased, so that the data recording efficiency can be improved. Further, since data is produced to the data bus NRZ while delayed by the reproduction delay time, the data flow control circuit 22 is adapted to process the data delayed by the reproduction delay time.

In other words, according to the present invention, the format control and the data control can be made separately. Consequently, the pad area PAD can be reduced to the minimum and the effective data recording area can be increased, so that the data recording efficiency can be improved.

Concretely, the pad area PAD requiring about 8 bytes in the prior art can be reduced to about 2 bytes. Further, the pad area PAD requiring 512 bytes or more in the prior art when the reproduction delay reaches 1 sector (about 512 bytes) can be also reduced about 2 bytes (the data recording efficiency is reduced to about 40% for the pad area PAD of 512 bytes or more but can ensure about 75% for the pad area PAD of about 2 bytes).

Second Embodiment

In the second embodiment, the synchronization information detection signal SBD of the signals for connecting the record and reproduction processing circuit 6 and the data control circuit 7 shown in FIG. 1 is deleted.

Figure 8:
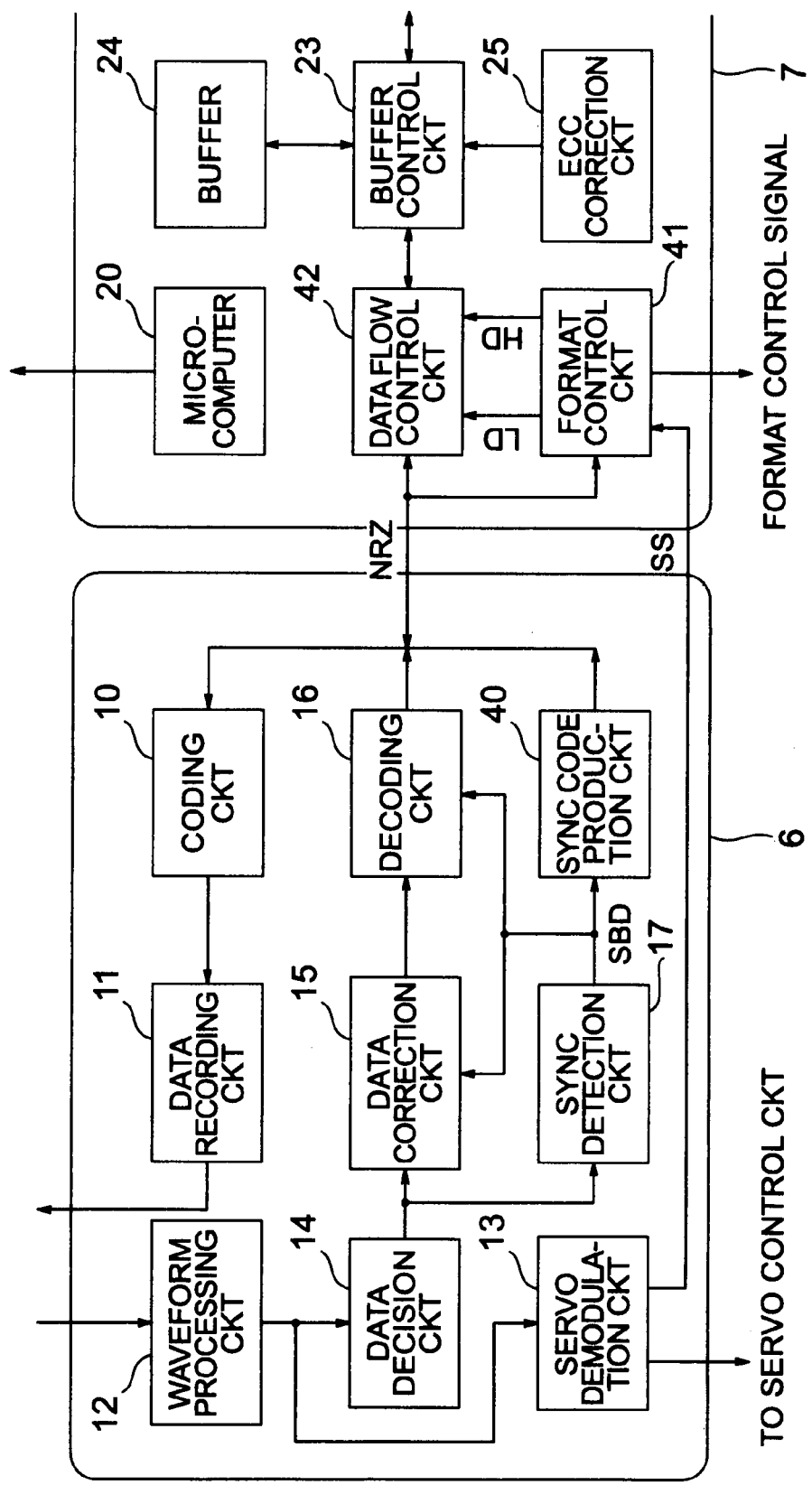
FIG. 8 is a block diagram schematically illustrating a main portion of a magnetic disk apparatus according to a second embodiment.

FIG. 8 is a schematic diagram illustrating a main portion of a magnetic disk apparatus according to the second embodiment of the present invention. In FIG. 8, a record and reproduction processing circuit 6' and a data control circuit 7' are used in order to distinguish the record and reproduction processing circuit 6 and the data control circuit 7 shown in FIG. 1 therefrom.

The record and reproduction processing circuit 6' includes the coding circuit 10 and the data recording circuit 11 constituting a data recording path, the waveform processing circuit 12, the data decision circuit 14, the data correction circuit 15 and the decoding circuit 16 constituting a data reproduction path, the servo demodulation circuit 13 constituting a servo control path, and the SYNC detection circuit 17 and a SYNC code production circuit 40 for transmitting a SYNC information through the data bus NRZ to the data control circuit 7'.

The data control circuit 7' includes the interface control circuit 26 (not shown), the microcomputer 20, the buffer 24, the buffer control circuit 23, the ECC correction circuit 25, and a format control circuit 41 and a data flow control circuit 42 for performing format control and data processing on the basis of information from the data bus NRZ.

Figure 9A:
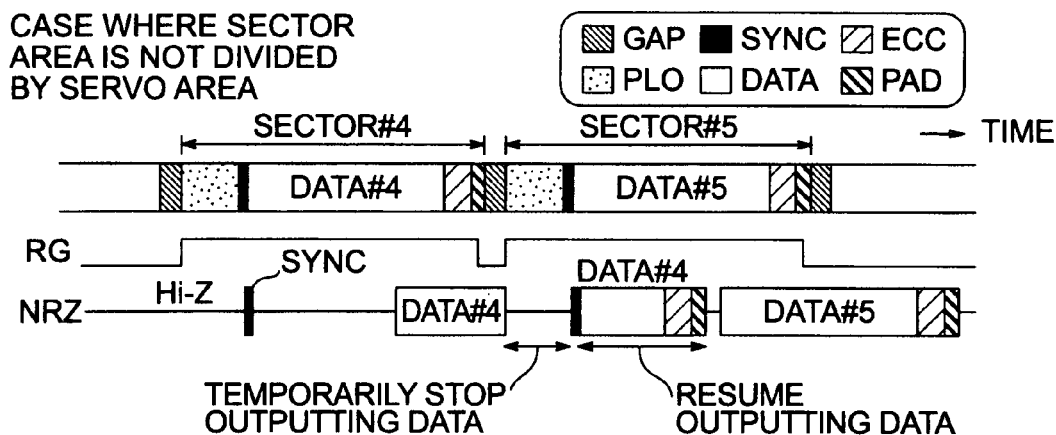
FIGS. 9A and 9B are time diagrams showing successive sector reproduction operation in the second embodiment.
Figure 9B:
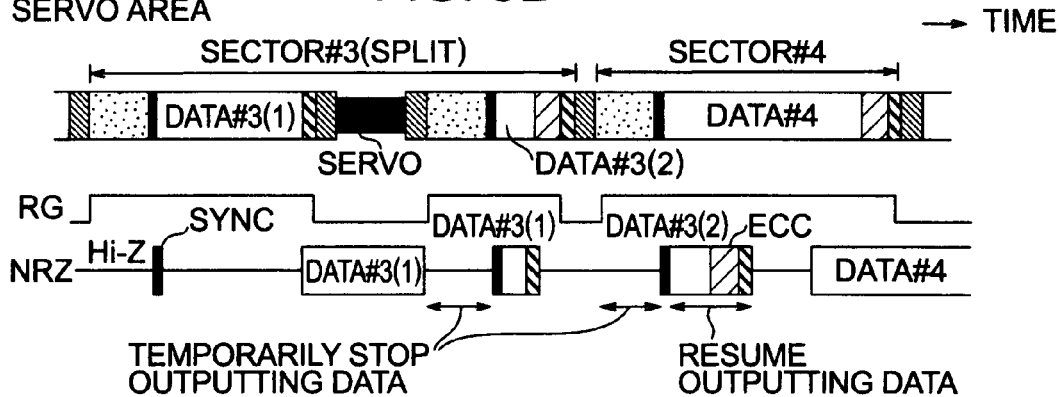

FIGS. 9A and 9B are diagrams for explaining data flow on the data bus NRZ between the record and reproduction processing circuit 6' and the data control circuit 7' in the reproduction operation. For simplification of the drawings, it is assumed that the sector reproduction operation performed before the read gate signal RG becomes active has been completed.

FIG. 9A shows successive reproduction operation for a non-split sector.

When the read gate signal RG is active at the beginning position of the sector #4, the waveform processing circuit 12 and the data decision circuit 14 starts the data decision operation for the sector.

When the SYNC detection circuit 17 detects the symbol synchronization information SYNC, the SYNC detection circuit activates the synchronization information detection signal SBD. Since there is no transfer of data on the data bus NRZ, when the synchronization information detection signal SBD is active, the SYNC code production circuit 40 produces a particular symbol synchronization information SYNC to the data bus NRZ.

When the synchronization information detection signal SBD is active, the data correction circuit 15 and the decoding circuit 16 starts correction and decoding of data and produces data (DATA #4) to the data bus NRZ after the elapse of the reproduction delay time.

The data bus NRZ becomes high impedance (Hi-Z) during the period from the particular symbol synchronization information SYNC to the beginning of the data (DATA #4).

The format control circuit 14 activates the load signal LD when the particular symbol synchronization information SYNC is detected.

When the Load signal LD is active, the data flow control circuit 42 transfers the data (DATA #4) on the data bus NRZ after the elapse of the reproduction delay time to the buffer control circuit 23.

The read gate signal RG corresponding to the sector #4 is active at the final position of the sector #4, while since the data (DATA #4) and data of the subsequent error check code ECC and pad information PAD have been already taken in internal memory circuit of the data correction circuit 15 and the decoding circuit 16, the data are produced to the data bus NRZ from the data correction circuit 15 and the decoding circuit 16 subsequently.

When the read gate signal RG corresponding to the sector #5 is active, the data correction circuit 15 and the decoding circuit 16 interrupt outputting to the data bus NRZ temporarily. Accordingly, the data bus NRZ becomes high impedance (Hi-Z).

When the SYNC detection circuit 17 detects the symbol synchronization information SYNC for the sector #5, the synchronization information detection signal SBD is active and the SYNC code production circuit 40 produces the particular symbol synchronization information SYNC to the data bus NRZ.

Subsequently, the data correction circuit 15 and the decoding circuit 16 resume outputting the data (DATA #4) and the subsequent error check code ECC and pad information PAD stored in the internal memory circuit to the data bus NRZ.

At the same time, the data correction circuit 15 and the decoding circuit 16 perform correction and decoding processing of data of the sector #5 by means of the internal memory circuit, while since the reproduction delay time is not reached, outputting thereof to the data bus NRZ is not made. When outputting of the pad information PAD of the sector #4 is completed, the data bus NRZ becomes high impedance (Hi-Z).

Thereafter, when the reproduction delay time elapses, the data (DATA #5) and the subsequent data including the error check code ECC and the pad information PAD are outputted from the data correction circuit 15 and the decoding circuit 16 to the data bus NRZ. FIG. 9A shows the case where the read gate signal RG is not active during outputting of the data (DATA #5) of the sector #5 to the data bus NRZ. When the read gate signal RG is active, the outputting thereof to the data bus NRZ is divided in the same manner as the data (DATA #4) of the sector #4.

FIG. 9B shows successive reproduction operation of the split sector and the non-split sector.

In the same manner as the FIG. 9A, when the read gate signal RG is active at the beginning position of the sector #3 and the symbol synchronization information SYNC is detected, the particular symbol synchronization information SYNC is outputted to the data bus NRZ. After the elapse of the reproduction delay time, the data (DATA #3(1)) positioned before the servo area is outputted to the data bus NRZ.

After the passage of the servo area, when the read gate signal RG is active again at the beginning position of the data (DATA #3(2)) positioned behind the servo area, outputting of the data (DATA #3(1)) positioned before the servo area is interrupted temporarily and the data bus NRZ becomes high impedance (Hi-Z).

When the symbol synchronization information SYNC of the data (DATA #3(2)) positioned behind the servo area is detected, the particular symbol synchronization information SYNC is outputted to the data bus NRZ.

Subsequently, outputting of the data (DATA #3(1)) positioned before the servo area is resumed.

Thereafter, when the reproduction delay time elapses, the data (DATA #3(2)) positioned behind the servo area is outputted to the data bus NRZ from the data correction circuit 15 and the decoding circuit 16, while in this example since the read gate signal RG corresponding to the sector #4 is first active, the outputting is interrupted temporarily and the data bus NRZ becomes high impedance (Hi-Z).

When the symbol synchronization information SYNC for the sector #4 is detected, the particular symbol synchronization information SYNC is outputted to the data bus NRZ.

Subsequently, outputting of the data (DATA #3(2)) positioned behind the servo area is resumed.

Thereafter, when the reproduction delay time elapses, the data (DATA #4) is outputted to the data bus NRZ from the data correction circuit 15 and the decoding circuit 16.

The control method in case where the symbol synchronization information SYNC is not detected is now described.

Figure 10A:
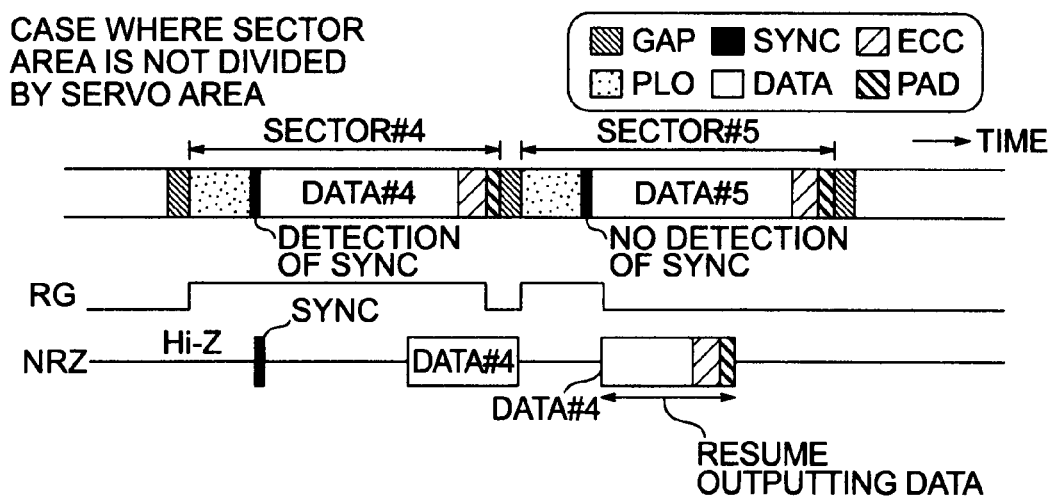
FIGS. 10A and 10B are timing diagrams showing reproduction operation in case where symbol synchronization information SYNC is not detected in the second embodiment.

FIG. 10A shows the timing in case where the symbol synchronization information SYNC for the sector #5 is not detected in the successive reproduction operation of the non-split sector.

The particular symbol synchronization information SYNC for the sector #4 is outputted to the data bus NRZ and after the elapse of the reproduction delay time, a part of the data (DATA #4) is outputted. When the read gate signal RG for the sector #5 is active, outputting of the data (DATA #4) is interrupted temporarily. Thereafter, since the symbol synchronization information SYNC for the sector #5 is not detected, the particular symbol synchronization information SYNC for the sector #5 is not also outputted. Accordingly, outputting of the data (DATA #4) is not also resumed. However, since the synchronization information detection signal SBD is not active within the predetermined period, the read gate signal RG for the sector #5 is inactive, so that outputting of the data (DATA #4) is resumed. Thus, outputting of the data for the sector #4 is completed.

Figure 10B:
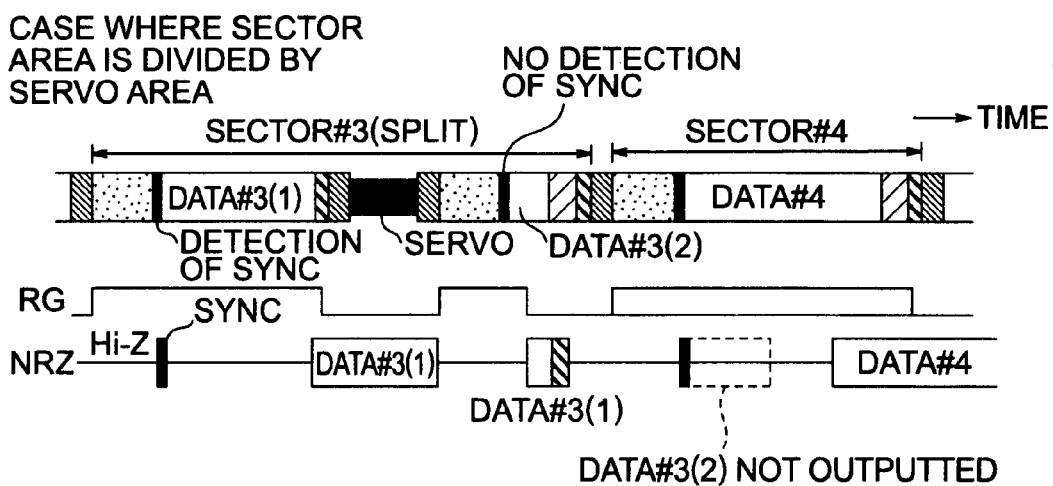
Figure 13:
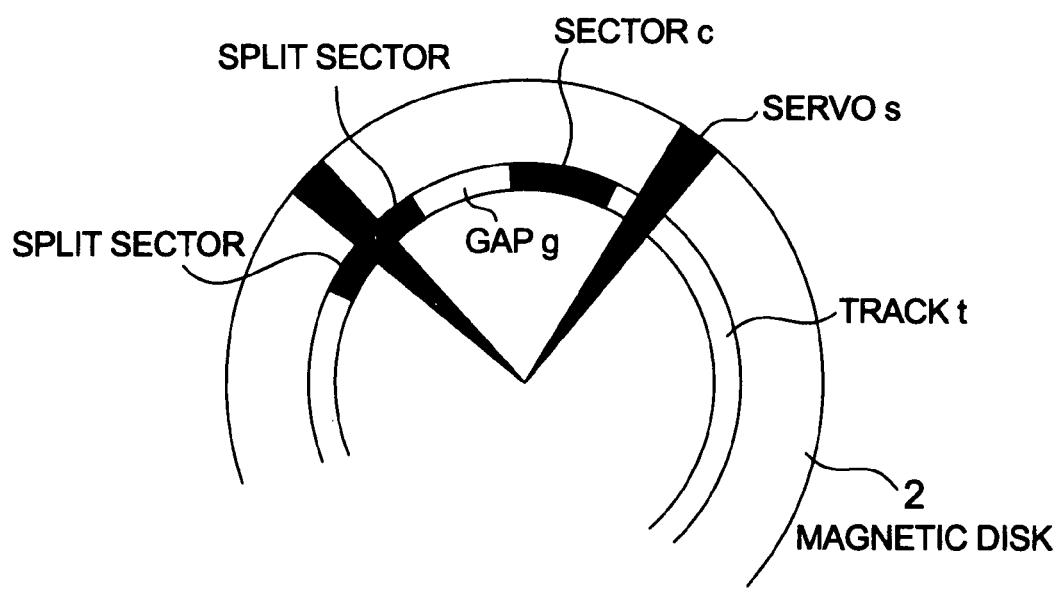
FIG. 13 is a schematic diagram illustrating a general track format of a magnetic disk.

FIG. 10B shows the timing in case where the symbol synchronization information SYNC positioned behind the servo area for the split sector #3 is not detected in the successive reproduction operation of the split sector and the non-split sector.

When the data (DATA #3(1)) positioned before the servo area for the split sector #3 is being outputted to the data bus NRZ, the read gate signal RG for the data DATA #3(2) positioned behind the servo area for the split sector #3 is active and accordingly outputting is interrupted temporarily. The symbol synchronization information SYNC for the data DATA #3(2) positioned behind the servo area for the split sector #3 is not detected and accordingly when the read gate signal RG is inactive, outputting of the data (DATA #3(1)) positioned before the servo area for the split sector #3 is resumed. However, since the symbol synchronization information SYNC is not detected, correction and decoding processing of the data DATA #3(2) positioned behind the servo area for the split sector #3 is not performed and the data is not outputted to the data bus NRZ. In this case, since the data for the sector #3 disappears partially, data recovery processing such as retrying is made.

FIG. 11 is a schematic diagram illustrating the format control circuit 41 and the data flow control circuit 42.

As compared with FIG. 2, the circuits shown in FIG. 11 is different from FIG. 2 in that the sequencer 50 is provided instead of the sequencer 33 of FIG. 2, data on the data bus NRZ is inputted to the sequencer 50 instead of inputting the synchronization information detection signal SBD to the sequencer 33, and a hold signal HD is supplied from the sequencer 50 to a data transfer counter 51.

The recording operation of the sequencer 50 is the quite same as that of the sequencer 33 of FIG. 2.

The sequencer 50 in the reproduction operation activates the read gate signal RG and the hold signal HD for temporarily holding the counting operation of the data transfer counter 51. Further, when the sequencer 50 detects the particular symbol synchronization information SYNC on the data bus NRZ, the sequencer activates the load signal LD and inactivates the hold signal HD.

The reproduction delay counter 36 activates the ST signal after delaying it by the number of bytes for the reproduction delay in comparison with the load signal LD.

The data transfer counter 51 counts the number of data transferred to the buffer control circuit 23, while when the hold signal HD is active, the data transfer is temporarily interrupted when the read gate signal RG is turned to active. When the hold signal HD is turned to inactive, the data transfer is resumed.

FIGS. 12A and 12B show control procedures of the sequencer 50 and the data flow control circuit 42.

The control procedures include usual processing (1) for processing the non-split sector and the split sector and exceptional processing (2) performed when the symbol synchronization information SYNC is not detected within a prescribed time.

The usual processing shown in FIG. 12A is made in steps 1 to 9.

The sequencer 50 activates the read gate signal RG in step 1 and when the particular symbol synchronization information SYNC is detected on the data bus NRZ within a fixed period in step 2, the control proceeds to step 3 and when it is not detected, the control proceeds to the exceptional processing. In step 3, the control is in the waiting state until the prescribed number of bytes is counted. In step 4, the read gate signal RG is inactivated. In the case of the non-split sector, since the data processing of the prescribed number of bytes is completed, the processing is ended in step 4. In the case of the split sector, the control is in the waiting state until the servo area passes in step 5 and the read gate signal RG is activated again in step 6. In step 7, when the particular symbol synchronization information SYNC is detected within the fixed period, the control proceeds to step 8 and when it is not detected, the control proceeds to the exceptional processing. In step 8, the control is in the waiting state during the prescribed number of bytes. In step 9, the read gate signal RG is inactivated.

In step 1 in which the read gate signal RG is active, the data flow control circuit 42 temporarily stops data transfer when data is being transferred. In step 2, the temporary stop of the data transfer is continued and when the particular symbol synchronization information SYNC is detected and the control proceeds to step 3, the data transfer is resumed when the data transfer is temporarily stopped and when the data transfer is not temporarily stopped, the control is in the waiting state during the number of reproduction delay bytes in response to the load signal LD supplied from the sequencer 50 and the data transfer of the prescribed number of bytes is made. In steps 4 and 5, the data transfer is continued when the data transfer is being made. Steps 6 to 9 are the same as steps 1 to 5.

The exceptional processing shown in FIG. 12B is made in steps 1 and 2.

The sequencer 50 inactivates the read gate signal RG in step 1 and notifies occurrence of data error to the microcomputer 20 in step 2 to make retrying processing.

The data flow control circuit 42 resumes the data transfer when the data transfer is in the temporary stop state in step 1. The data transfer is stopped in step 2.

According to the second embodiment, the particular symbol synchronization information SYNC on the data bus NRZ is used instead of the synchronization information detection signal SBD, so that the SYNC information can be notified from the record and reproduction processing circuit 6' to the data control circuit 7. Accordingly, when the circuit is fabricated by an LSI, the number of pins and a wiring area for the LSI can be reduced.

Third Embodiment

Figure 15:
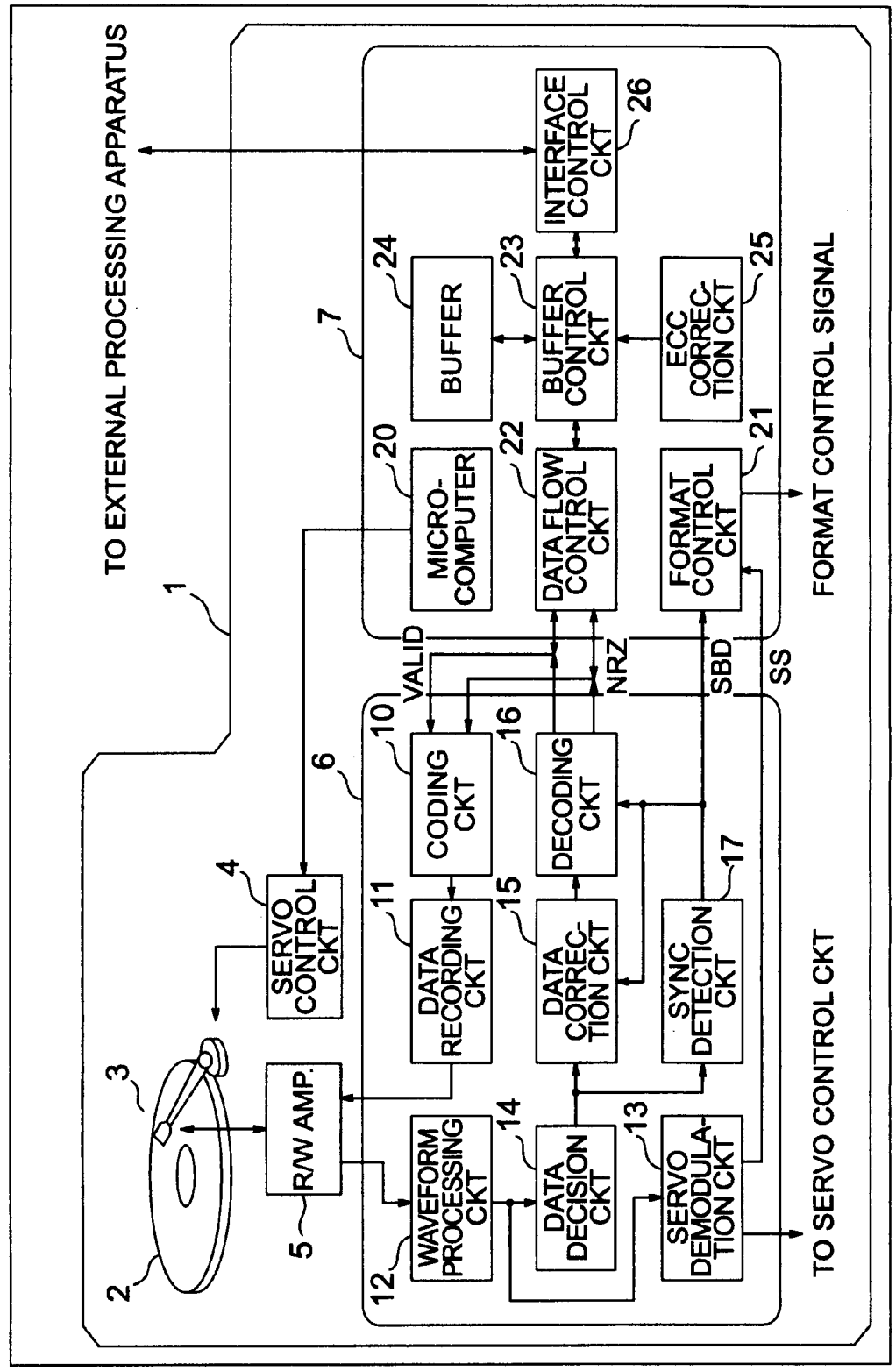
FIG. 15 is a block diagram schematically illustrating a magnetic recording and reproducing apparatus according to a third embodiment.

In the third embodiment, a control signal indicating the data output period is provided newly to attain simplification of control. FIG. 15 is a schematic diagram illustrating a magnetic recording and reproducing apparatus to which the third embodiment is applied. As compared with FIG. 1, the third embodiment of FIG. 15 is different from FIG. 1 in that the LD signal for causing the format control circuit 21 to control the data flow control circuit 22 is changed to a newly provided VALID signal. The VALID signal is a bidirectional signal indicating that data on the NRZ is ensured and is supplied to the decoding circuit 16, the coding circuit 10 and the data flow control circuit 22. The VALID signal is different depending on the recording operation and the reproduction operation and indicates an output period of NRZ data. Operation of changing the direction of the VALID signal is made by data flow control circuit 22 in the recording operation and by the decoding circuit 16 in the reproduction operation. The decoding circuit 16 has the function of prescribing the data range.

Recording Operation

Figure 16:
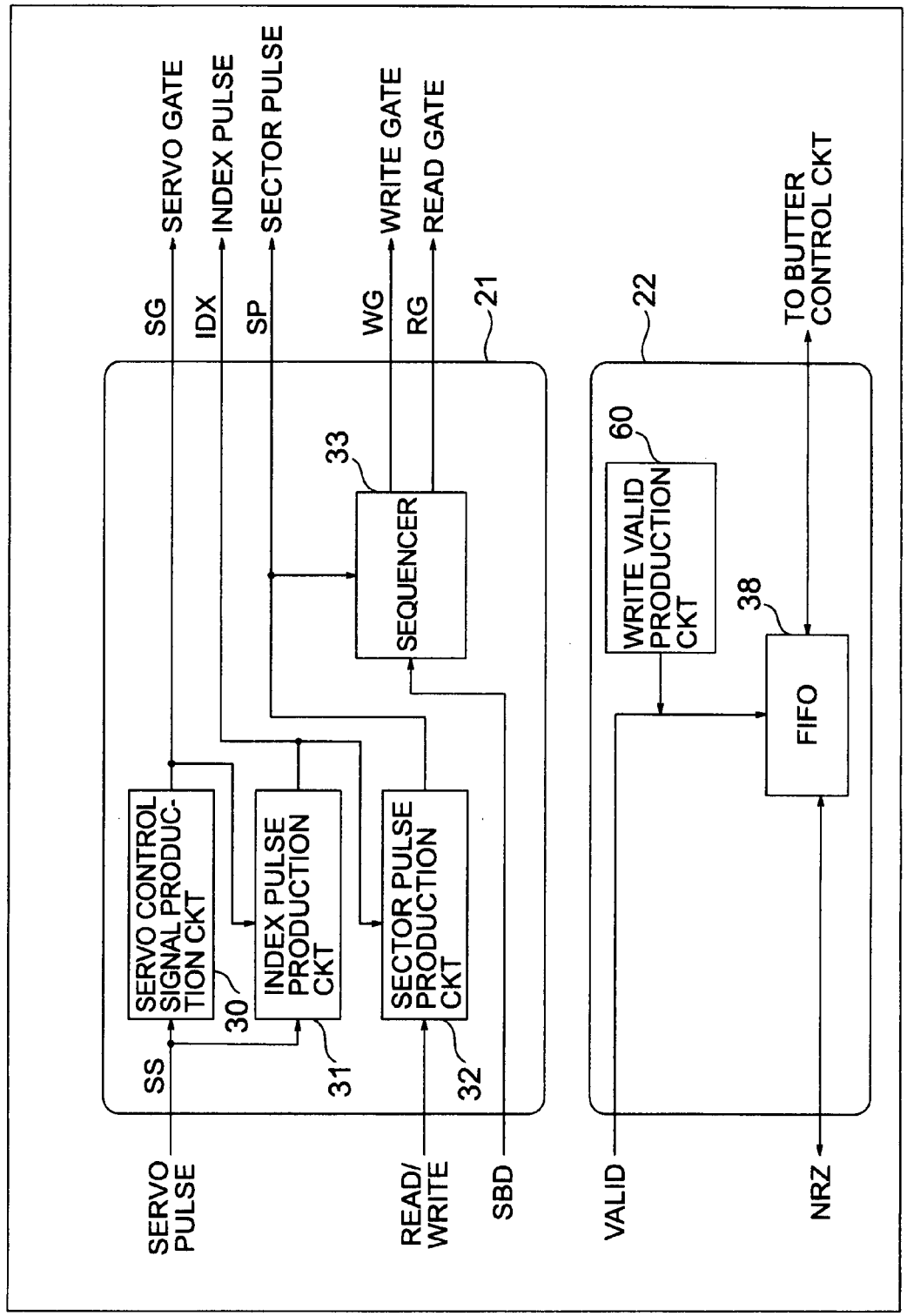
FIG. 16 is a block diagram schematically illustrating a format control circuit and a data flow control circuit in the third embodiment.

The data flow control circuit 22 newly includes, as shown in a configuration example of FIG. 16, a write valid production circuit 60 for producing a valid signal in the recording operation in addition to the configuration of FIG. 2. The fixed data production circuit 34 and the selection circuit 35 are assumed to be included in the coding circuit 10. The data string sent out from the buffer control circuit is once stored in the FIFO 38 and then when the VALID signal produced by the write valid production circuit 60 is activate, the output data of the FIFO 38 is outputted to the coding circuit 10 as the NRZ data. The coding circuit 10 has the same function as the fixed data production circuit 34 and records data such as PLO and SYNC together with the converted NRZ data.

Figure 17A:
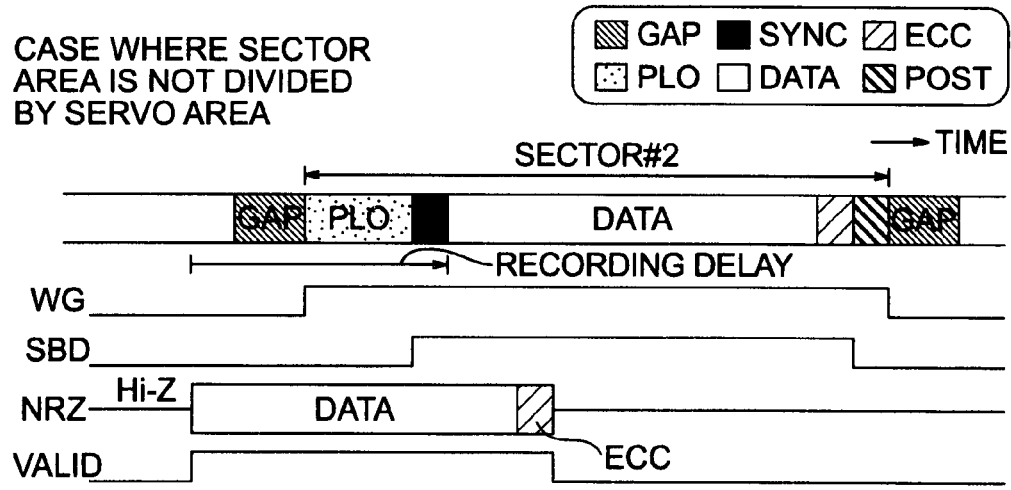
FIGS. 17A and 17B are timing diagrams showing single sector recording operation in the third embodiment.
Figure 17B:
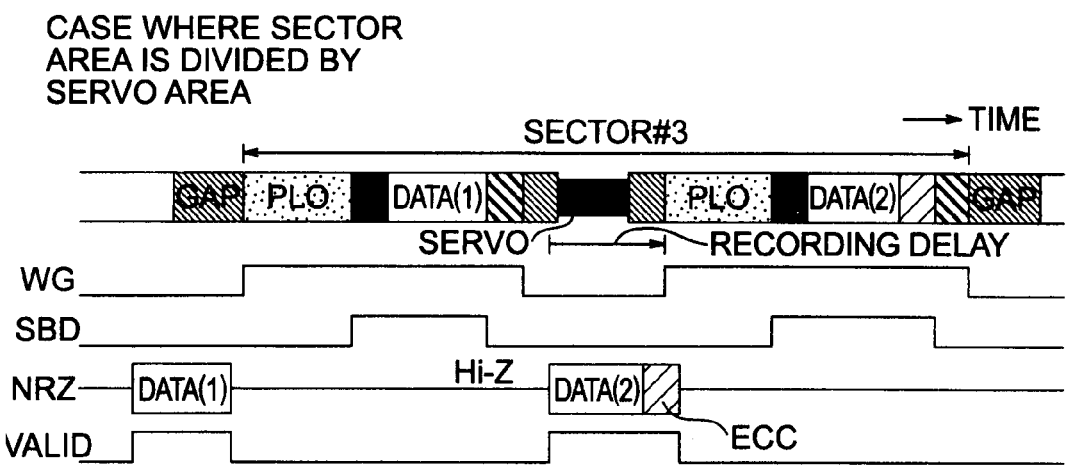

The above operation timing is shown in FIGS. 17A and 17B. The VALID signal has the same timing in both cases where the sector area is not divided by the servo area and where the sector area is divided by the servo area and the VALID signal is active only when data on the data bus NRZ is settled. When the WG signal rises after the elapse of the record delay time, the PLO signal is produced from the data recording circuit 11 and when the SBD signal rises, the SYNC signal is produced from the data recording circuit 11. When the NRZ data in the period that the VALID signal is active is processed, the SBD signal falls and the POST signal is recorded. Thereafter, the WG signal falls and the series of recording operation is completed.

Reproduction Operation

In the reproduction operation, the decoding circuit 16 activates the VALID signal at the same time that the NRZ data is sent out. The VALID signal and the NRZ data are supplied to the FIFO 38 of the data flow control circuit 22 as shown in FIG. 16. The FIFO 38 takes in the NRZ data when the VALID signal is active and thereafter the FIFO 38 sends out the data to the buffer control circuit.

Figure 18A:
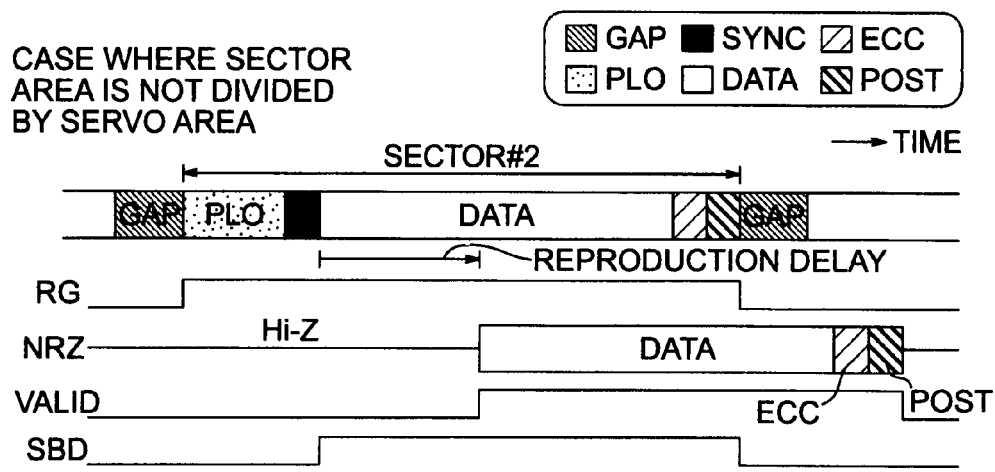
FIGS. 18A and 18B are timing diagram showing single sector reproduction operation in the third embodiment.
Figure 18B:
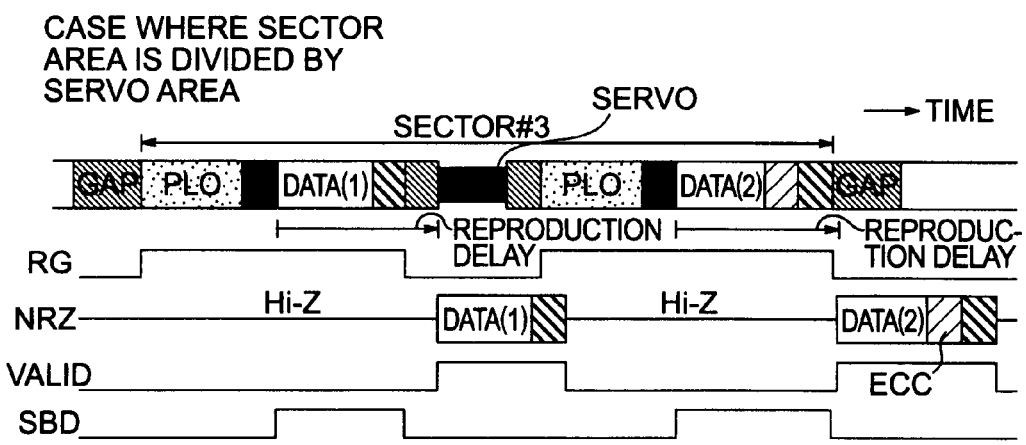

The VALID signal is produced in accordance with the timing of the data outputted in the NRZ data as shown in FIGS. 18A and 18B in detail. At this time, the rising edge of the SBD signal is produced in response to detection of the SYNC area on the recording medium, while since the NRZ data and the VALID signal are produced after the elapse of the reproduction delay time starting from the detection of the SYNC, the SBD signal is asserted at an earlier timing than the NRZ data and the VALID signal. The format control circuit 21 produces a falling edge of the RG signal in the POST area on the recording medium from the assert position of the SBD signal. The SBD signal is negated in accordance with the falling edge of the RG signal. The record and reproduction processing circuit 6 detects the period from the assert position of the SBD signal to the falling edge of the RG signal and recognizes it as the number of data to be transferred. The record and reproduction processing circuit 6 produces the data as the NRZ data to the data flow control circuit 22 on the basis of the recognized number of data to be transferred after the elapse of the reproduction delay time.

According to the embodiment, the magnetic recording and reproducing apparatus is configured on the basis of the control signal (VALID signal) indicating the data output period, so that the control signals are increased but the control circuit can be simplified.

In the recording operation example of the embodiment, the case where the recording delay is increased has been described and accordingly the output timing of the NRZ data is earlier than the assert timing of the WG signal by the recording delay time. However, the recording delay is a conversion delay of the coding circuit 10 or the data recording circuit 11 and since the recording delay is largely different depending on a configuration of the coding circuit, there is a case where the recording delay is small as described in the prior art. In this case, the output timings of the WG signal and the NRZ data may be coincident as described in the prior art, that is, the VALID signal and the WG signal can be made common.

Further, there is a case where a memory for temporarily storing recording data is required in the cording circuit 10 or the record and reproduction processing circuit 6 in order to delay the NRZ data, although it is not shown in the embodiments.

Another Embodiment

Figure 19:
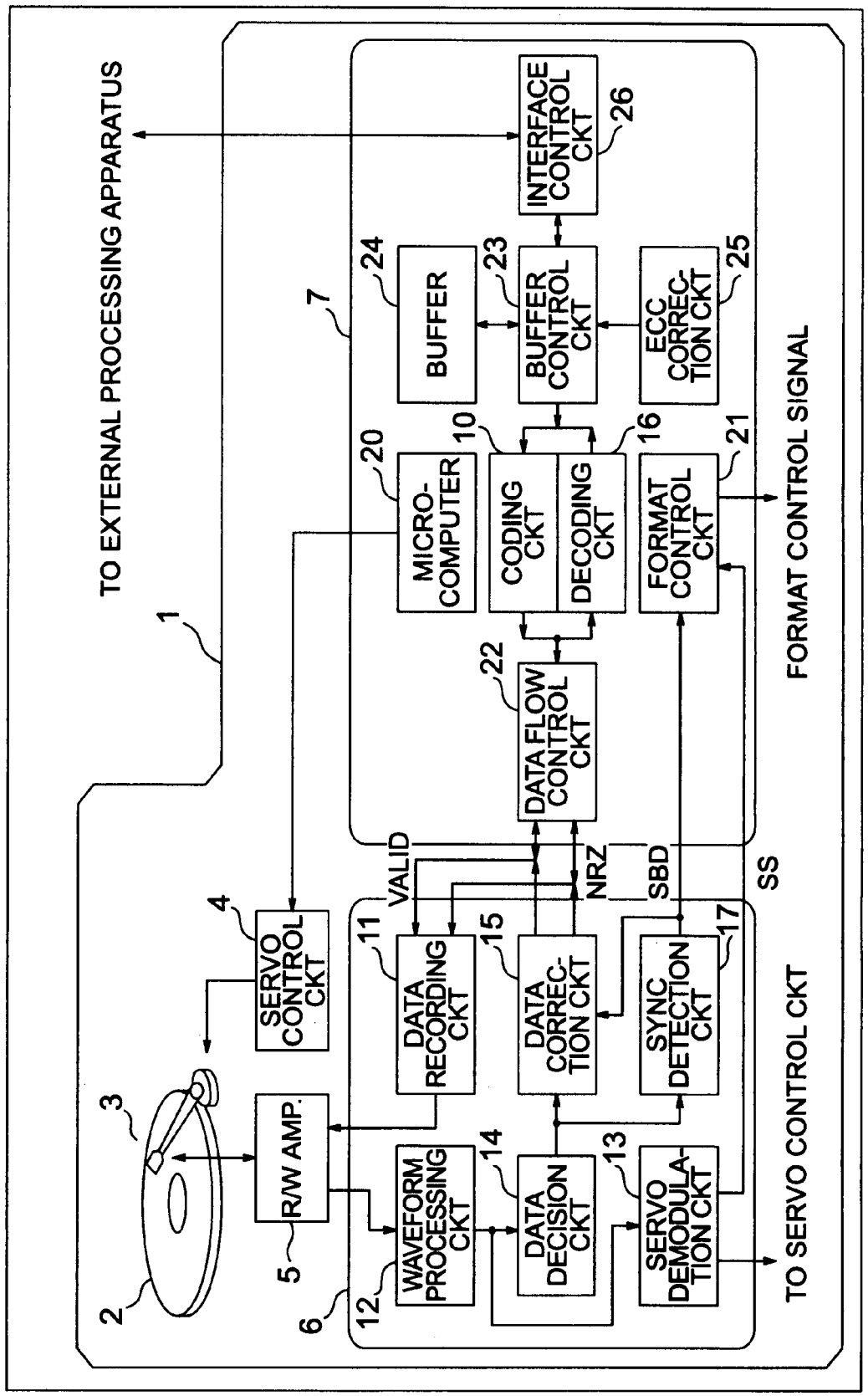
FIG. 19 is a block diagram schematically illustrating a magnetic recording and reproducing apparatus according to another embodiment.

An example of a magnetic recording and reproducing apparatus to which the third embodiment is applied is described. FIG. 19 is a schematic diagram illustrating the magnetic recording and reproducing apparatus including the coding circuit 10 and decoding circuit 16 disposed between the buffer control circuit 23 and the data flow control circuit 22 which can record and reproduce the coded data. In the embodiment, the data decision circuit 14 and the data correction circuit 15 function as a coding and reproducing circuit.

Recording Operation

Figure 20:
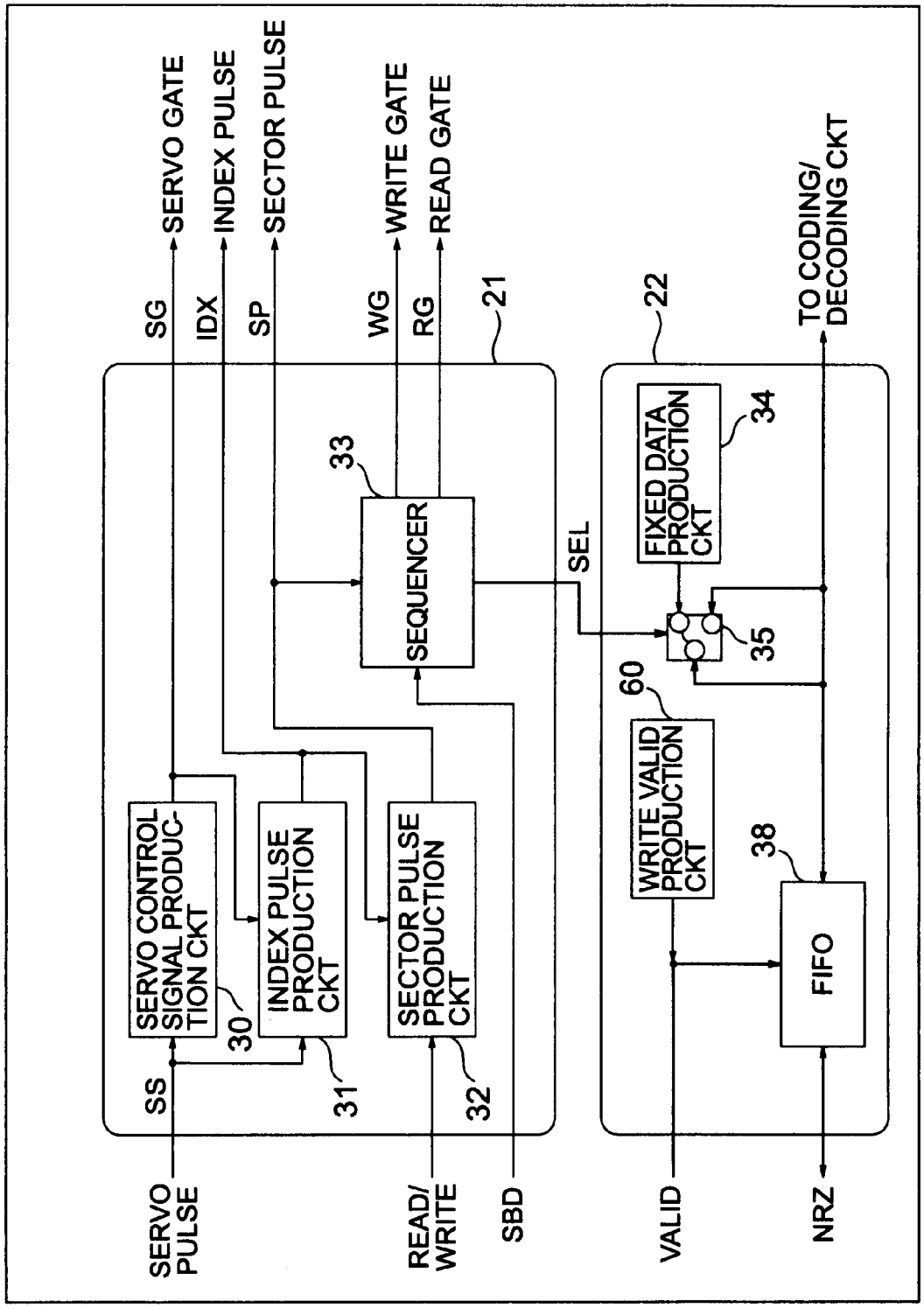
FIG. 20 is a block diagram schematically illustrating a format control circuit and a data flow control circuit in the embodiment shown in FIG. 19.

In the recording operation, the coding circuit 10 codes a data string sent from the buffer control circuit 23 and sends it to the data flow control circuit 22 which produces the coded data string differently from the above configuration example. The flow control circuit 22 includes, as shown in FIG. 20, the fixed data production circuit 34, the selection circuit 35, the write valid production circuit 60 and an FIFO 38. The FIFO 38 stores data produced from the fixed data production circuit 34 and data produced from the coding circuit 10 in the range indicated by the sequencer 33 and produces the data to the data recording circuit 11 as the NRZ data on the basis of the VALID signal produced by the write valid production circuit 60.

Figure 21A:
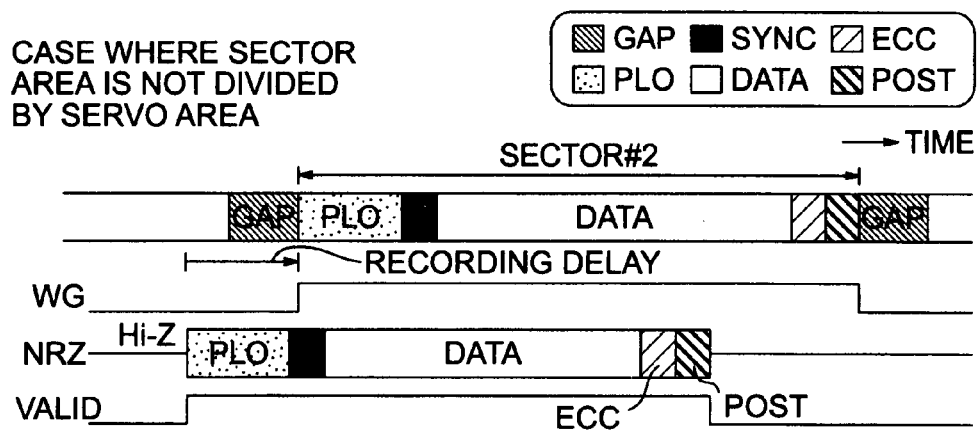
FIGS. 21A and 21B are timing diagrams showing single sector recording operation in the embodiment shown in FIG. 19.
Figure 21B:
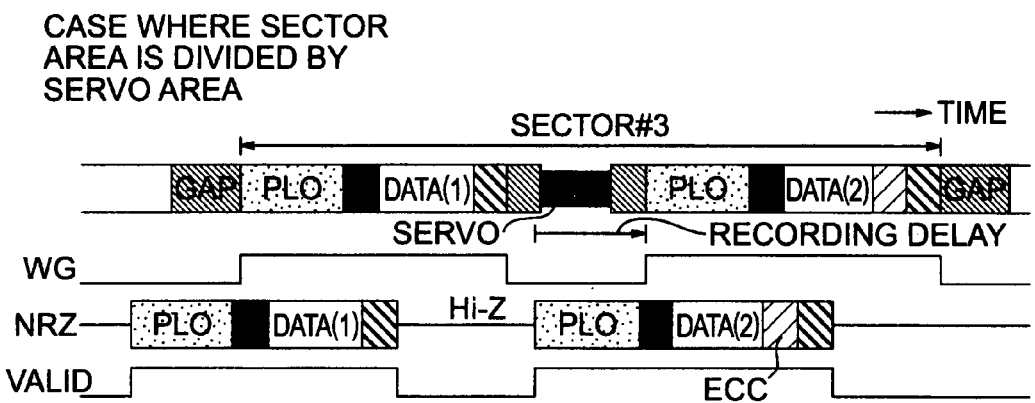

The timing of the VALID signal and the NRZ data is shown in FIGS. 21A and 21B. The NRZ data sent from the FIFO 38 is a series of data including PLO, SYNC, DATA, ECC and POST, which are the data string which can be recorded directly through the data recording circuit 11. When the WG signal rises, the NRZ data is directly recorded in the recording medium and accordingly it is easy to control the timing without the need of indicating a record position by means of the above SBD signal.

Reproduction Operation

In the reproduction operation, the data correction signal 15 activates the VALID signal at the same time that the NRZ data is sent out. The VALID signal and the NRZ data are supplied to the FIFO 38 of the data flow control circuit 22 as shown in FIG. 20. The FIFO 38 takes in the NRZ data when the VALID signal is active and thereafter sends out data to the decoding circuit 16.

The detailed timing of the VALID signal is the same as shown in the FIG. 18 except that the NRZ data is data which is not decoded by the decoding circuit 16 and the VALID signal is produced in response to the timing of data outputted to the NRZ data. The rising edge of the SBD signal is produced in response to detection of the SYNC area on the recording medium and the NRZ data and the VALID signal are produced after the elapse of the reproduction delay time starting from the detection of SYNC. The data flow control circuit 22 produces the NRZ data to the buffer control circuit 23 through the decoding circuit 16.

According to the embodiment, even in the data recording and reproducing apparatus having the different configuration, the magnetic recording and reproducing apparatus is configured on the basis of the control signal (VALID signal) indicating the data output period, so that the control circuit can be simplified similarly.

Another Embodiment

In the first, second and third embodiment, the magnetic disk apparatus has been described by way of example, while the present invention can be applied to the data recording and reproducing apparatus such as an optical magnetic disk apparatus and a magnetic tape apparatus other than the above magnetic disk apparatus. Furthermore, the present invention can be also applied to a data reproduction apparatus of LSI level of components constituting the data recording and reproducing apparatus such as the magnetic disk apparatus, the optical magnetic disk apparatus and the magnetic tape apparatus.

According to the data reproduction apparatus of the present invention, since the synchronization information detection signal is not produced from the data reproduction means which produces the output delayed by the reproduction delay time but the synchronization information detection signal is produced from the synchronization information detection means which produces the output without substantial delay, the end position of the block on the recording medium can be calculated exactly on the basis of the synchronization information detection signal without influence of the reproduction delay time. Accordingly, it is not required to provide an additional area (pad area PAD in the magnetic disk) longer than the reproduction delay time in the end of the block in order to ensure that the data reproduction means reads out information of the block from the recording medium. Accordingly, the additional area can be minimized and the effectively usable data storage area can be increased, so that the data recording efficiency can be improved.

Similarly, reduction of the data recording efficiency due to the recording delay can be reduced to the minimum even in the recording operation.

The invention claimed is:

1. A data reproduction apparatus comprising:
   a synchronization information detection circuit for detecting synchronization information of a block to be reproduced from a recording medium in which a series of data string having said synchronization information added thereto is recorded as a block to produce a synchronization information detection signal;
   a block end position calculation circuit for calculating an end position of said block on said recording medium on a basis of said synchronization information detection signal;
   a data reproduction circuit for reading out data recorded from said detected synchronization information to said calculated end position of said block from said recording medium to reproduce the data;
   a data processing circuit for processing data produced from said data reproduction circuit after elapse of a reproduction delay time on the basis of said synchronization information detection signal;
   a first unit including said synchronization information detection circuit and said data reproduction circuit; and
   a second unit including said block end position calculation circuit and said data processing circuit,
   wherein said synchronization information detection signal is sent from said first unit to said second unit and said data is sent from said first unit to said second unit after said synchronization information detection signal has been sent and
   wherein said synchronization information detection signal and said data are sent from said first unit to said second unit through the same signal line and when synchronization information of a second block continuing to a first block is detected while said data reproduction circuit produces a data string of said first block, outputting of the data string of said first block is temporarily reserved and after said synchronization information detection circuit detects said synchronization information of said second block or after a predetermined time elapses from the time that said synchronization information is not detected, the outputting of the data string of said first block is resumed.

2. A data reproduction apparatus according to claim 1, wherein said data reproduction circuit includes a read/write amplifier circuit for interfacing a record signal from said recording medium, a waveform processing circuit for processing data from said read/write amplifier circuit, and a data decision circuit for reproducing data from said waveform processing circuit.

3. A data reproduction apparatus according to claim 1, further comprising:
   a first unit including said synchronization information detection circuit and said data reproduction circuit; and
   a second unit including said block end position calculation circuit and said data processing circuit;
   wherein said synchronization information detection signal and said data are sent from said first unit to said second unit and said calculated block end position is notified from said second unit to said first unit.

4. The data reproduction apparatus according to claim 1, further comprising:
   a format control circuit for activating a reading command signal for commanding to read a block to be reproduced on a recording medium in which a plurality of blocks are recorded as a block unit having a data string including:
   bit synchronization information for performing bit synchronization;
   symbol synchronization information for performing symbol synchronization;
   data;
   correction information for correcting said data; and
   additional area; wherein
   said synchronization information detection circuit reads a block on said recording medium during a period that said reading command signals is active and detects said symbol synchronization information to produce said synchronization information detection signal;
   said data reproduction circuit reproduces said data and said correction information of said block read out from said recording medium during the period that said reading command signal is active on the basis of said synchronization information detection signal to be produced.

5. The data reproduction apparatus according to claim 1, further comprising:
   a code reproduction circuit for reproducing a code string on the basis of said synchronization information detection signal to be produced; and
   a decoding circuit for decoding said code string produced from said code reproduction circuit on the basis of said synchronization information detection signal;
   wherein after said synchronization information detection signal is produced, said code string is processed by said decoding circuit.

6. The data reproduction apparatus according to claim 1, further comprising:
   a data string production circuit for producing a series of data string having said synchronization information added thereto;
   a recording circuit for recording said data string in a recording medium as a record data string; and
   a control circuit for controlling said data string production circuit and said recording circuit independently;

wherein said control circuit controls said recording circuit and produces said record data string after said data string of said data string production circuit is produced.

7. A data reproduction apparatus according to claim 6, further comprising:
   a third unit including said data string production circuit and said control circuit; and
   a fourth unit including said recording circuit;
   wherein said data string and a control signal for controlling said recording circuit by means of said control circuit are sent from said third unit to said fourth unit and said data string is produced in advance.

8. The data reproduction apparatus according to claim 1, further comprising:
   a data production circuit for sending out said data;
   a coding circuit for coding said data;
   a data string production circuit for adding synchronization information to said coded data to produce a data string;
   a recording circuit for recording said data string as a record data string; and
   format control circuit for controlling said data string production circuit and said recording circuit independently;
   wherein said format control circuit controls said recording circuit and produces said records data string after when said data string of said data string production circuit is produced.

9. A data reproduction apparatus according to claim 1, further comprising:
   a data range prescribing circuit for producing a data settling signal indicative of a range of data produced from said data reproduction circuit;
   a first unit including said synchronization information detection circuit, said data reproduction circuit and said data range prescribing circuit; and
   a second unit including said block end position calculation circuit and said data processing circuit;
   wherein said synchronization information detection signal is sent from said first unit to said second unit and said data and said data settling signal are sent from said first unit to said second unit after said synchronization information detection signal has been sent.

10. A data reproduction apparatus comprising:
    a synchronization information detection circuit for detecting synchronization information of a block to be reproduced from a recording medium in which a series of data string having said synchronization information added thereto is recorded as a block to produce a synchronization information detection signal;
    a block end position calculation circuit for calculating an end position of said block on said recording medium on a basis of said synchronization information detection signal;
    a data reproduction circuit for reading out data recorded from said detected synchronization information to said calculated end position of said block from said recording medium to reproduce the data; and
    a data processing circuit for processing data produced from said data reproduction circuit after elapse of a reproduction delay time on the basis of said synchronization information detection signal;
    a data range prescribing circuit for producing a data settling signal indicative of a range of data produced from said data reproduction circuit;
    a first unit including said synchronization information detection circuit, said data reproduction circuit and said data range prescribing circuit; and
    a second unit including said block end position calculation circuit and said data processing circuit;
    wherein said synchronization information detection signal is sent from said first unit to said second unit and said data and said data settling signal are sent from said first unit to said second unit after said synchronization information detection signal has been sent.

11. A data reproduction apparatus according to claim 10, further comprising:
    a first unit including said synchronization information detection circuit and said data reproduction circuit; and
    a second unit including said block end position calculation circuit and said data processing circuit;
    wherein said synchronization information detection signal is sent from said first unit to said second unit and said data is sent from said first unit to said second unit after said synchronization information detection signal has been sent.

12. A data reproduction apparatus according to claim 10, wherein said data reproduction circuit includes a read/write amplifier circuit for interfacing a record signal from said recording medium, a waveform processing circuit for processing data from said read/write amplifier circuit, and a data decision circuit for reproducing data from said waveform processing circuit.

13. A data reproduction apparatus according to claim 10, further comprising:
    a first unit including said synchronization information detection circuit and said data reproduction circuit; and
    a second unit including said block end position calculation circuit and said data processing circuit;
    wherein said synchronization information detection signal and said data are sent from said first unit to said second unit and said calculated block end position is notified from said second unit to said first unit.

14. A data reproduction apparatus according to claim 13, wherein said synchronization information detection signal and said data are sent from said first unit to said second unit through the same signal line and when synchronization information of a second block continuing to a first block is detected while said data reproduction circuit procedures produces a data string of said first block, outputting of the data string of said first block is temporarily reserved and after said synchronization information detection circuit detects said synchronization information of said second block or after a predetermined time elapses from the time that said synchronization information is not detected, the outputting of the data string of said first block is resumed.

15. The data reproduction apparatus according to claim 10, further comprising:
    a format control circuit for activating a reading command signal for commanding to read a block to be reproduced on a recording medium in which a plurality of blocks are recorded as a block unit having a data string including:
    bit synchronization information for performing bit synchronization;
    symbol synchronization information for performing symbol synchronization;
    data;
    correction information for correcting said data; and
    additional area; wherein
    said synchronization information detection circuit reads a block on said recording medium during a period that said reading command signals is active and detects said symbol synchronization information to produce said synchronization information detection signal;

said data reproduction circuit reproduces said data and said correction information of said block read out from said recording medium during the period that said reading command signal is active on the basis of said synchronization information detection signal to be produced.

16. The data reproduction apparatus according to claim 10, further comprising:
   a code reproduction circuit for reproducing a code string on the basis of said synchronization information detection signal to be produced; and
   a decoding circuit for decoding said code string produced from said code reproduction circuit on the basis of said synchronization information detection signal;
   wherein after said synchronization information detection signal is produced, said code string is processed by said decoding circuit.

17. The data reproduction apparatus according to claim 10, further comprising:
   a data string production circuit for producing a series of data string having said synchronization information added thereto;
   a recording circuit for recording said data string in a recording medium as a record data string; and
   a control circuit for controlling said data string production circuit and said recording circuit independently;
   wherein said control circuit controls said recording circuit and produces said record data string after said data string of said data string production circuit is produced.

18. A data reproduction apparatus according to claim 17, further comprising:
   a first unit including said data string production circuit and said control circuit; and
   a second unit including said recording circuit;
   wherein said data string and a control signal for controlling said recording circuit by means of said control circuit are sent from said first unit to said second unit and said data string is produced in advance.

19. The data reproduction apparatus according to claim 10, further comprising:
   a data production circuit for sending out said data;
   a coding circuit for coding said data;
   a data string production circuit for adding synchronization information to said coded data to produce a data string;
   a recording circuit for recording said data string as a record data string; and
   format control circuit for controlling said data string production circuit and said recording circuit independently;
   wherein said format control circuit controls said recording circuit and produces said records data string after when said data string of said data string production circuit is produced.

\* \* \* \* \*